(12) United States Patent
Naito et al.

(10) Patent No.: US 10,962,107 B2
(45) Date of Patent: Mar. 30, 2021

(54) CONTROL DEVICE FOR VEHICLE

(71) Applicant: TOYOTA JIDOSHA KABUSHIKI KAISHA, Toyota (JP)

(72) Inventors: Shuma Naito, Toyota (JP); Atsushi Tabata, Okazaki (JP); Tetsuya Kono, Okazaki (JP); Kouichi Okuda, Toyota (JP); Kota Fujii, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/729,566

(22) Filed: Dec. 30, 2019

(65) Prior Publication Data

US 2020/0256460 A1 Aug. 13, 2020

(30) Foreign Application Priority Data

Feb. 8, 2019 (JP) .............................. JP2019-022159

(51) Int. Cl.
| | |
|---|---|
| *B60W 10/06* | (2006.01) |
| *B60W 10/10* | (2012.01) |
| *F16H 61/16* | (2006.01) |
| *F02D 41/02* | (2006.01) |
| *F02D 41/06* | (2006.01) |
| *F16H 61/02* | (2006.01) |

(52) U.S. Cl.
CPC ......... *F16H 61/16* (2013.01); *F02D 41/0225* (2013.01); *F02D 41/06* (2013.01); *F16H 61/0204* (2013.01)

(58) Field of Classification Search
CPC .. F16H 61/16; F16H 61/0204; F02D 41/0225; F02D 41/06; B60W 10/06; B60W 10/10; B60W 20/30; B60W 20/40; B60W 30/192; B60W 60/001
See application file for complete search history.

(56) References Cited

U.S. PATENT DOCUMENTS

| 10,330,070 B2 * | 6/2019 | Hao .......................... H02P 6/20 |
| 2008/0132379 A1 | 6/2008 | Matsubara et al. |

(Continued)

FOREIGN PATENT DOCUMENTS

| JP | 2006-213149 A | 8/2006 |
| JP | 2008-137619 A | 6/2008 |
| JP | 2012-051564 A | 3/2012 |

*Primary Examiner* — Edwin A Young
(74) *Attorney, Agent, or Firm* — Oblon, McClelland, Maier & Neustadt, L.L.P.

(57) ABSTRACT

A control device for a vehicle includes an electronic control unit configured to perform an automatic driving control, to determine whether there is a possibility that a start control of an engine and a gear shift control of an automatic transmission are concurrently executed in a future traveling under the automatic driving control, during execution of the automatic driving control, and to first execute one control of the start control of the engine and the gear shift control of the automatic transmission in the future traveling and execute the other control after the one control finishes, when the electronic control unit determines that there is the possibility that the start control of the engine and the gear shift control of the automatic transmission are concurrently executed in the future traveling under the automatic driving control.

7 Claims, 8 Drawing Sheets

(56) References Cited

U.S. PATENT DOCUMENTS

| | | | | |
|---|---|---|---|---|
| 2008/0261770 | A1* | 10/2008 | Tabata | B60W 20/15 |
| | | | | 477/5 |
| 2009/0017984 | A1* | 1/2009 | Shibata | B60W 10/08 |
| | | | | 477/3 |
| 2009/0055073 | A1* | 2/2009 | Matsubara | B60K 6/445 |
| | | | | 701/102 |
| 2013/0124027 | A1* | 5/2013 | Tanishima | B60W 10/06 |
| | | | | 701/22 |
| 2015/0353068 | A1* | 12/2015 | Nefcy | B60W 20/40 |
| | | | | 701/22 |

\* cited by examiner

FIG. 2

| AT GEAR STEP | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |

CONTROL DEVICE FOR VEHICLE

INCORPORATION BY REFERENCE

The disclosure of Japanese Patent Application No. 2019-022159 filed on Feb. 8, 2019 including the specification, drawings and abstract is incorporated herein by reference in its entirety.

BACKGROUND

1. Technical Field

The disclosure relates to a control device for a vehicle including an engine, a rotating machine and an automatic transmission.

2. Description of Related Art

There is well known a control device for a vehicle including an engine, a rotating machine that functions as a dynamic power source for traveling, and an automatic transmission that constitutes a part of a dynamic power transmitting route between the rotating machine and a driving wheel. As an example of the control device, there is a vehicle engine rotation control device described in Japanese Patent Application Publication No. 2012-51564 (JP 2012-51564 A). In the disclosure of JP 2012-51564 A, when a gear shift control of the automatic transmission and a start control of the engine are determined to concurrently be executed, one control of the gear shift control and the start control for which execution determination has been made earlier is preferentially executed, and execution of the other control is started after execution of the one control finishes, so that shock is reduced.

SUMMARY

Further, there is well known an automatic driving control for traveling by automatically performing acceleration or deceleration and steering based on a set target traveling state. During the traveling under the automatic driving control, similarly, it is desired to prevent the gear shift control of the automatic transmission and the start control of the engine from being concurrently executed. In the above-described control disclosed in JP 2012-51564 A, it is not possible to perform the control of executing the gear shift control and the start control in turn before an actual occurrence of a situation where the gear shift control and the start control are concurrently executed. Therefore, one control of the gear shift control and the start control is necessarily executed late relative to a period during which the gear shift control and the start control are concurrently executed. That is, after the actual occurrence of the situation where the gear shift control and the start control are concurrently executed, the gear shift control and the start control can be executed in turn, only when one control is executed late. Since the gear shift control and the start control are prevented from being concurrently executed only when one control is executed late in the same way, there is a possibility of deterioration in acceleration responsiveness, for example, in a circumstance where increase in driving torque is needed.

The disclosure has been made in the context of the above points, and provides a control device for a vehicle that makes it possible to avoid one control, of the start control of the engine and the gear shift control of the automatic transmission, being executed late in the same way relative to the period during which the start control of the engine and the gear shift control of the automatic transmission are concurrently executed actually, in the traveling under the automatic driving control.

A control device for a vehicle according to an aspect of the disclosure is a control device for a vehicle, the vehicle including an engine, a rotating machine that functions as a dynamic power source for traveling, and an automatic transmission that constitutes a part of a dynamic power transmitting route between the rotating machine and a driving wheel, the control device including an electronic control unit configured to set a target traveling state, to perform an automatic driving control for traveling by automatically performing acceleration or deceleration and steering based on the target traveling state, to determine whether there is a possibility that a start control of the engine and a gear shift control of the automatic transmission are concurrently executed in a future traveling under the automatic driving control, during execution of the automatic driving control, and to first execute one control of the start control of the engine and the gear shift control of the automatic transmission in the future traveling and execute the other control after the one control finishes, when the electronic control unit determines that there is the possibility that the start control of the engine and the gear shift control of the automatic transmission are concurrently executed in the future traveling under the automatic driving control.

With the configuration, when the electronic control unit determines that there is a possibility that the start control of the engine and the gear shift control of the automatic transmission are concurrently executed in the future traveling under the automatic driving control, one control of the start control and the gear shift control is first executed in the future traveling, and the other control is executed after the one control finishes. Accordingly, it is possible to perform a control of executing the start control and the gear shift control in turn, without an actual occurrence of a situation where the start control and the gear shift control are concurrently executed in the traveling under the automatic driving control. Therefore, it is possible to avoid one control, of the start control of the engine and the gear shift control of the automatic transmission, being executed late in the same way relative to the period during which the start control of the engine and the gear shift control of the automatic transmission are concurrently executed actually, in the traveling under the automatic driving control.

In the control device for the vehicle according to the aspect, the electronic control unit may be configured to execute the start control of the engine such that the start control of the engine finishes before an execution start time point of the gear shift control of the automatic transmission when the electronic control unit determines that there is the possibility that the start control of the engine and the gear shift control of the automatic transmission are concurrently executed.

With the configuration, the start control of the engine is executed such that the start control of the engine finishes before the execution start time point of the gear shift control of the automatic transmission when the electronic control unit determines that there is a possibility that the start control of the engine and the gear shift control of the automatic transmission are concurrently executed. Accordingly, it is possible to restrain shock due to the concurrent execution of the start control and the gear shift control. Further, in a circumstance where increase in driving torque is needed, the engine is started early, and thereby, acceleration responsiveness is improved.

In the control device for the vehicle according to the aspect, the electronic control unit may be configured to execute the start control of the engine after the gear shift control of the automatic transmission finishes when the electronic control unit determines that there is the possibility that the start control of the engine and the gear shift control of the automatic transmission are concurrently executed.

With the configuration, the start control of the engine is executed after the gear shift control of the automatic transmission finishes when the electronic control unit determines that there is a possibility that the start control of the engine and the gear shift control of the automatic transmission are concurrently executed. Accordingly, it is possible to restrain the shock due to the concurrent execution of the start control and the gear shift control. Further, in a circumstance where the increase in driving torque is not required, the engine is started late, and thereby, fuel efficiency is improved.

In the control device for the vehicle according to the aspect, the electronic control unit may be configured to execute the gear shift control of the automatic transmission such that the gear shift control of the automatic transmission finishes before an execution start time point of the start control of the engine when the electronic control unit determines that there is the possibility that the start control of the engine and the gear shift control of the automatic transmission are concurrently executed.

With the configuration, the gear shift control of the automatic transmission is executed such that the gear shift control of the automatic transmission finishes before the execution start time point of the start control of the engine when the electronic control unit determines that there is a possibility that the start control of the engine and the gear shift control of the automatic transmission are concurrently executed. Accordingly, it is possible to restrain the shock due to the concurrent execution of the start control and the gear shift control. Further, in the circumstance where the increase in driving torque is needed, downshift is executed early, for example, and thereby, the acceleration responsiveness is improved.

In the control device for the vehicle according to the aspect, the electronic control unit may be configured to alter the target traveling state of the automatic driving control when the electronic control unit determines that there is the possibility that the start control of the engine and the gear shift control of the automatic transmission are concurrently executed, when the electronic control unit determines that there is the possibility that the start control of the engine and the gear shift control of the automatic transmission are concurrently executed in the future traveling under the automatic driving control.

With the configuration, when the electronic control unit determines that there is a possibility that the start control of the engine and the gear shift control of the automatic transmission are concurrently executed in the future traveling under the automatic driving control, the target traveling state of the automatic driving control when the electronic control unit determines that there is a possibility that the start control of the engine and the gear shift control of the automatic transmission are concurrently executed is altered. Accordingly, it is possible to first execute one control of the start control and the gear shift control in the future traveling. Thereby, it is possible to restrain the shock due to the concurrent execution of the start control and the gear shift control. Further, in the circumstance where the increase in driving torque is needed, the acceleration responsiveness is improved.

In the control device for the vehicle according to the aspect, the electronic control unit may be configured to alter the target traveling state of the automatic driving control by altering a change manner of a required driving amount when the electronic control unit determines that there is the possibility that the start control of the engine and the gear shift control of the automatic transmission are concurrently executed.

With the configuration, the target traveling state of the automatic driving control is altered by altering the change manner of the required driving amount when the electronic control unit determines that there is a possibility that the start control of the engine and the gear shift control of the automatic transmission are concurrently executed. Accordingly, one control of the start control and the gear shift control is appropriately executed first, in the future traveling.

In the control device for the vehicle according to the aspect, the electronic control unit may be configured to determine whether the electronic control unit is able to alter the target traveling state of the automatic driving control when the electronic control unit determines that there is the possibility that the start control of the engine and the gear shift control of the automatic transmission are concurrently executed, and the electronic control unit may be configured to alter the target traveling state of the automatic driving control when the electronic control unit determines that the electronic control unit is able to alter the target traveling state of the automatic driving control.

With the configuration, when the electronic control unit determines that the electronic control unit is able to alter the target traveling state of the automatic driving control, the target traveling state of the automatic driving control is altered. Accordingly, it is possible to determine whether it is possible to avoid an actual occurrence of the situation where the start control of the engine and the gear shift control of the automatic transmission are concurrently executed in the traveling under the automatic driving control, and it is possible to appropriately perform the control of executing the start control and the gear shift control in turn, based on the determination result.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is an operation chart for describing a relation between gear shift operation of a mechanical stepped transmission unit illustrated in FIG. 1 and combination of operation of an engagement device to be used for the gear shift operation;

DETAILED DESCRIPTION OF EMBODIMENTS

In embodiments of the disclosure, a gear ratio of a transmission such as an automatic transmission is "a rotating speed of a rotating member on the input side/a rotating speed of a rotating member on the output side". A high side of the gear ratio is a high vehicle speed side on which the gear ratio is small. A low side of the gear ratio is a low vehicle speed side on which the gear ratio is large. For example, a lowest-side gear ratio is a lowest vehicle speed-side gear ratio on which the vehicle speed is lowest, and is a maximal gear ratio on which the gear ratio is a maximal value.

Hereinafter, embodiments of the disclosure will be described in detail, with reference to the drawings.

First Embodiment

Figure 1:
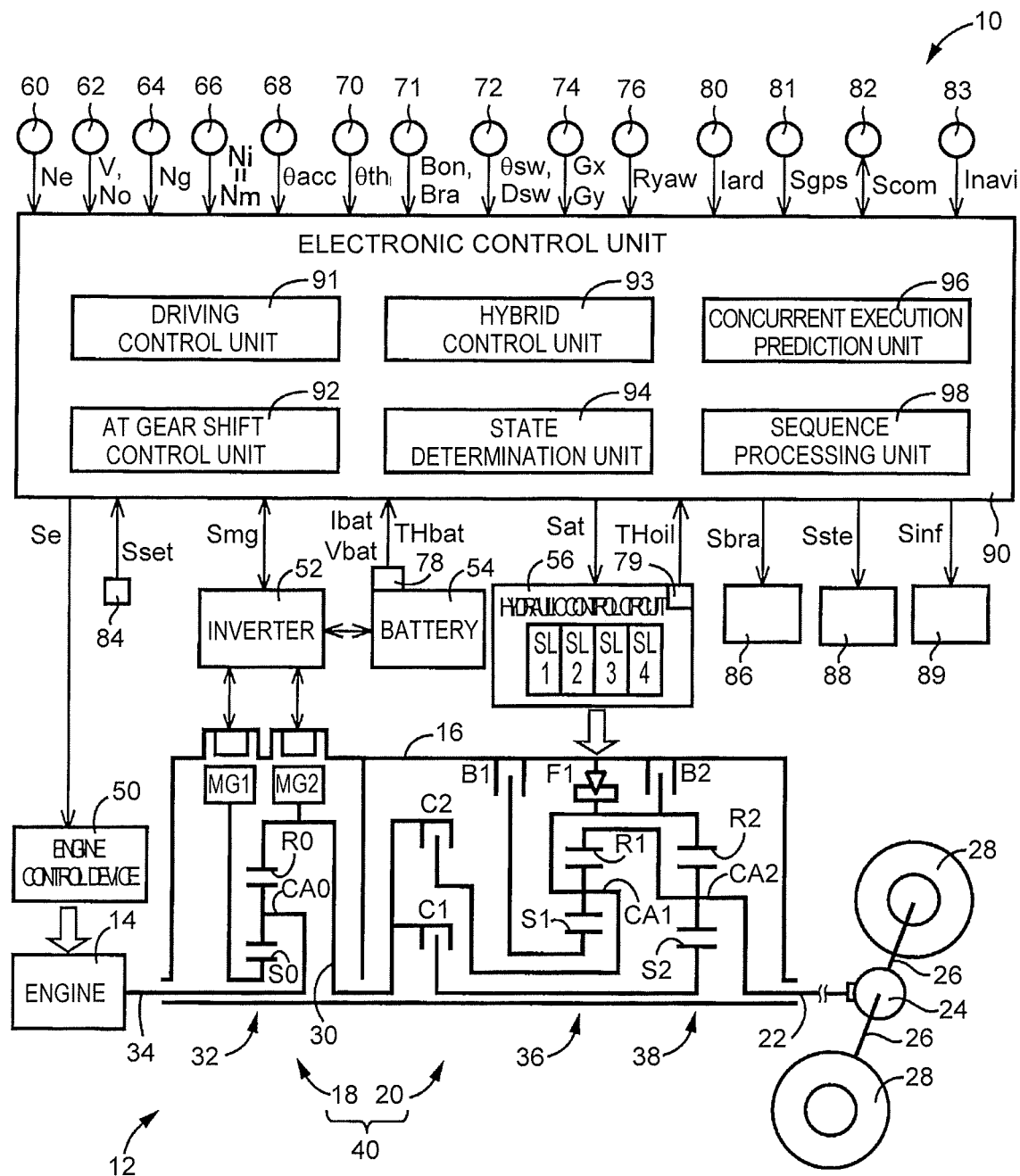
FIG. 1 is a diagram for describing a schematic configuration of a vehicle to which the disclosure is applied, and is a diagram for describing a principal part of a control function and a control system for various controls in the vehicle.

FIG. 1 is a diagram for describing a schematic configuration of a dynamic power transmitting device 12 included in a vehicle 10 to which the disclosure is applied, and is a diagram for describing a principal part of a control system for various controls in the vehicle 10. In FIG. 1, the vehicle 10 includes an engine 14, a first rotating machine MG1 and a second rotating machine MG2. The dynamic power transmitting device 12 includes an electrical stepless transmission unit 18, a mechanical stepped transmission unit 20 and the like that are provided in series on a common shaft core in a transmission case 16 as a non-rotating member attached to a vehicle body. The electrical stepless transmission unit 18 is coupled to the engine 14, directly, or indirectly through an unillustrated damper. The mechanical stepped transmission unit 20 is coupled to the output side of the electrical stepless transmission unit 18. The dynamic power transmitting device 12 includes a differential gear 24 coupled to an output shaft 22 that is an output rotating member of the mechanical stepped transmission unit 20, a pair of axles 26 coupled to the differential gear 24, and the like. In the dynamic power transmitting device 12, dynamic power output from the engine 14 or the second rotating machine MG2 is transmitted to the mechanical stepped transmission unit 20, and then, is transmitted from the mechanical stepped transmission unit 20 to driving wheels 28 of the vehicle 10 through the differential gear 24 and the like. Hereinafter, the transmission case 16 is referred to as the case 16, the electrical stepless transmission unit 18 is referred to as the stepless transmission unit 18, and the mechanical stepped transmission unit 20 is referred to as the stepped transmission unit 20. Unless otherwise noted, the dynamic power is equivalent to torque or force. The stepless transmission unit 18, the stepped transmission unit 20 and the like are configured so as to be nearly symmetric with respect to the common shaft core. In FIG. 1, the lower half of the shaft core is not illustrated. The common shaft core is a shaft core constituted by a crankshaft of the engine 14, a later-described coupling shaft 34, and the like.

The engine 14 is an engine to function as a dynamic power source that can generate driving torque, and for example, is a known internal combustion engine such as a gasoline engine and a diesel engine. In the engine 14, an engine control device 50 for a throttle actuator, a fuel injection device, an ignition device and the like that are included in the vehicle 10 is controlled by a later-described electronic control unit 90, and thereby, an engine torque Te that is an output torque of the engine 14 is controlled. In the embodiment, the engine 14 is coupled to the stepless transmission unit 18, without a fluid-type transmitting device such as a torques converter and a fluid coupling.

Each of the first rotating machine MG1 and the second rotating machine MG2 is an electric rotating machine that has a function as an electric motor (motor) and a function as an electric generator (generator), and is a so-called motor generator. Each of the first rotating machine MG1 and the second rotating machine MG2 is connected with a battery 54 as an electric storage device included in the vehicle 10, through an inverter 52 included in the vehicle 10. The inverter 52 is controlled by the later-described electronic control unit 90, and thereby, an MG1 torque Tg and an MG2 torque Tm that are respective output torques of the first rotating machine MG1 and the second rotating machine MG2 are controlled. The output torque of each rotating machine is a motoring torque in a positive torque on an acceleration side, and is a regenerative torque in a negative torque on a deceleration side. The battery 54 is an electric storage device that supplies electric power to each of the first rotating machine MG1 and the second rotating machine MG2 and receives electric power from each of the first rotating machine MG1 and the second rotating machine MG2.

The stepless transmission unit 18 includes the first rotating machine MG1 and a differential mechanism 32 as a power split mechanism that mechanically splits the dynamic power of the engine 14 into the first rotating machine MG1 and an intermediate transmitting member 30 that is an output rotating member of the stepless transmission unit 18. The second rotating machine MG2 is coupled to the intermediate transmitting member 30, such that dynamic power can be transmitted. The stepless transmission unit 18 is an electrical stepless transmission in which the operating state of the first rotating machine MG1 is controlled and thereby the differential state of the differential mechanism 32 is controlled. The first rotating machine MG1 is a rotating machine capable of controlling an engine speed Ne that is an engine speed of the engine 14, and is a rotating machine for differential. The second rotating machine MG2 is a rotating machine to function as a dynamic power source that can generate driving torque, and is a rotating machine for traveling drive. The vehicle 10 is a hybrid vehicle that includes the engine 14 and the second rotating machine MG2 as the dynamic power source for traveling. The dynamic power transmitting device 12 transmits the dynamic power of the dynamic power source to the driving wheels 28. Incidentally, to control the operating state of the first rotating machine MG1 is to perform an operation control of the first rotating machine MG1.

The differential mechanism 32 is constituted by a single pinion planetary gear device, and includes a sun gear S0, a carrier CA0 and a ring gear R0. The engine 14 is coupled to the carrier CA0 through the coupling shaft 34, such that dynamic power can be transmitted. The first rotating machine MG1 is coupled to the sun gear S0, such that dynamic power can be transmitted. The second rotating machine MG2 is coupled to the ring gear R0, such that dynamic power can be transmitted. In the differential mechanism 32, the carrier CA0 functions as an input element, the sun gear S0 functions as a reaction element, and the ring gear R0 functions as an output element.

The stepped transmission unit 20 is a mechanical transmission mechanism as a stepped transmission that constitutes a part of a dynamic power transmitting route between the intermediate transmitting member 30 and the driving wheels 28. That is, the stepped transmission unit 20 is a mechanical transmission mechanism that constitutes a part of a dynamic power transmitting route between the stepless transmission unit 18 and the driving wheels 28. The intermediate transmitting member 30 functions also as an input rotating member of the stepped transmission unit 20. The second rotating machine MG2 is coupled to the intermediate transmitting member 30, so as to rotate integrally, or the engine 14 is coupled to the input side of the stepless transmission unit 18. Therefore, the stepped transmission unit 20 is a transmission that constitutes a part of a dynamic power transmitting route between the dynamic power source (the second rotating machine MG2 or the engine 14) and the driving wheels 28. The intermediate transmitting member 30 is a transmitting member for transmitting the dynamic power of the dynamic power source to the driving wheels 28. For example, the stepped transmission unit 20 is a known planetary gear-type automatic transmission including a plurality of planetary gear devices of a first planetary gear device 36 and a second planetary gear device 38, and including a plurality of engagement devices of a one-way clutch F1, a clutch C1, a clutch C2, a brake B1 and a brake B2. Hereinafter, unless otherwise noted, the clutch C1, the clutch C2, a brake B1 and a brake B2 are referred to as merely an engagement device CB.

The engagement device CB is a hydraulic frictional engagement device constituted by multi-plate or single-plate clutches and brakes that are pressed by a hydraulic actuator, a band brake that is tightened by a hydraulic actuator, and the like. In the engagement device CB, by adjusted engagement hydraulic pressures PRcb as engagement pressures of the engagement device CB that are output from solenoid valves SL1 to SL4 or the like in a hydraulic control circuit 56 included in the vehicle 10, engagement torques Tcb that are respective torque capacities are changed, and thereby, respective operation states, each of which is a state such as engagement and disengagement, are switched.

In the stepped transmission unit 20, some of the rotating elements of the first planetary gear device 36 and the second planetary gear device 38 are coupled to each other, directly or indirectly through the engagement device CB or the one-way clutch F1, and some of the rotating elements are coupled to the intermediate transmitting member 30, the case 16 or the output shaft 22. The rotating elements of the first planetary gear device 36 are a sun gear S1, a carrier CA1 and a ring gear R1, and the rotating elements of the second planetary gear device 38 are a sun gear S2, a carrier CA2 and a ring gear R2.

The stepped transmission unit 20 is a stepped transmission that forms one gear step of a plurality of speed steps (also referred to as gear steps) having different gear ratios γat (=AT input rotating speed Ni/output rotating speed No), by engagement of one engagement device of a plurality of engagement devices. That is, the stepped transmission unit 20 switches the gear step (that is, executes the gear shift) by engaging one of the plurality of engagement devices. The stepped transmission unit 20 is a stepped automatic transmission that forms each of the plurality of gear steps. In the embodiment, the gear step to be formed in the stepped transmission unit 20 is referred to as an AT gear step. The AT input rotating speed Ni is the input rotating speed of the stepped transmission unit 20 that is the rotating speed of the input rotating member of the stepped transmission unit 20. The AT input rotating speed Ni has the same value as the rotating speed of the intermediate transmitting member 30, which is the same value as an MG2 rotating speed Nm that is the rotating speed of the second rotating machine MG2. The AT input rotating speed Ni can be expressed as the MG2 rotating speed Nm. An output rotating speed No is the rotating speed of the output shaft 22 that is the output rotating speed of the stepped transmission unit 20, and is also the output rotating speed of a composite transmission 40 that is a whole transmission constituted by the stepless transmission unit 18 and the stepped transmission unit 20. The composite transmission 40 is a transmission that constitutes a part of a dynamic power transmitting route between the engine 14 and the driving wheels 28.

Figure 2:
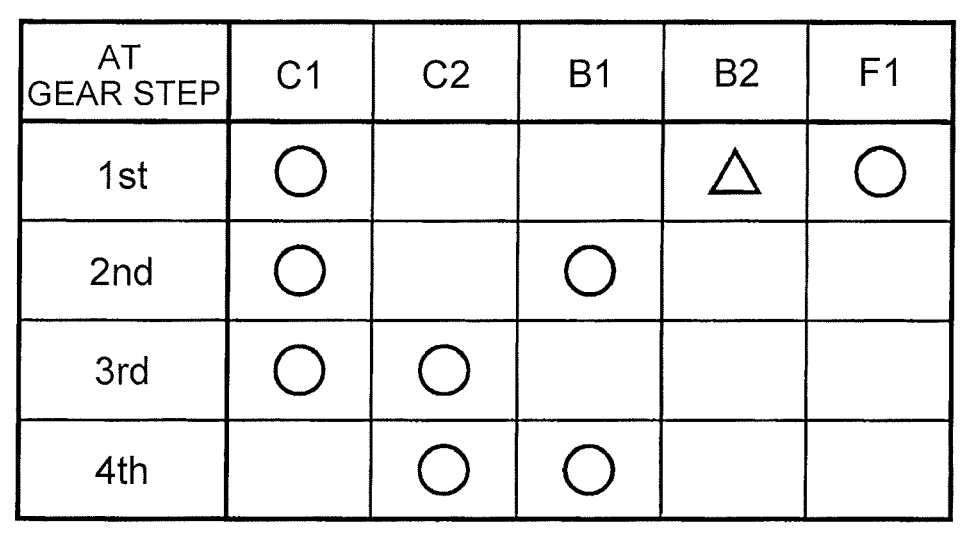

For example, as shown in an engagement operation table of FIG. 2, in the stepped transmission unit 20, four AT gear steps for forward movement, that is, an AT first gear step ("1st" in FIG. 2) to an AT fourth gear step ("4th" in FIG. 2) are formed as a plurality of AT gear steps. The gear ratio γat is maximized at the AT first gear step, and the gear ratio γat is smaller at a higher AT gear step. The engagement operation table of FIG. 2 collectively shows a relation between the AT gear steps and the operation states of the plurality of engagement devices. That is, the engagement operation table of FIG. 2 collectively shows a relation between the AT gear steps and predetermined engagement devices that are engagement devices to be respectively engaged at the AT gear steps. In FIG. 2, "circle" indicates the engagement, "triangle" indicates the engagement at the time of engine brake or at the time of coast downshift of the stepped transmission unit 20, and "blank" indicates the disengagement.

In the stepped transmission unit 20, the AT gear step to be formed depending on an accelerator operation by a driver, a vehicle speed V, or the like is switched by the later-described electronic control unit 90 (that is, one of the plurality of AT gear steps is selectively formed). For example, in a gear shift control of the stepped transmission unit 20, a so-called clutch-to-clutch gear shift is executed. In the clutch-to-clutch gear shift, the gear shift is executed by changing the member to be held in the engagement device CB, that is, the gear shift is executed by switching the engagement device CB between the engagement and the disengagement. In the embodiment, for example, a downshift from the AT second gear step to the AT first gear step is referred to as a "2→1 downshift". The same goes for other upshifts and downshifts.

Figure 3:
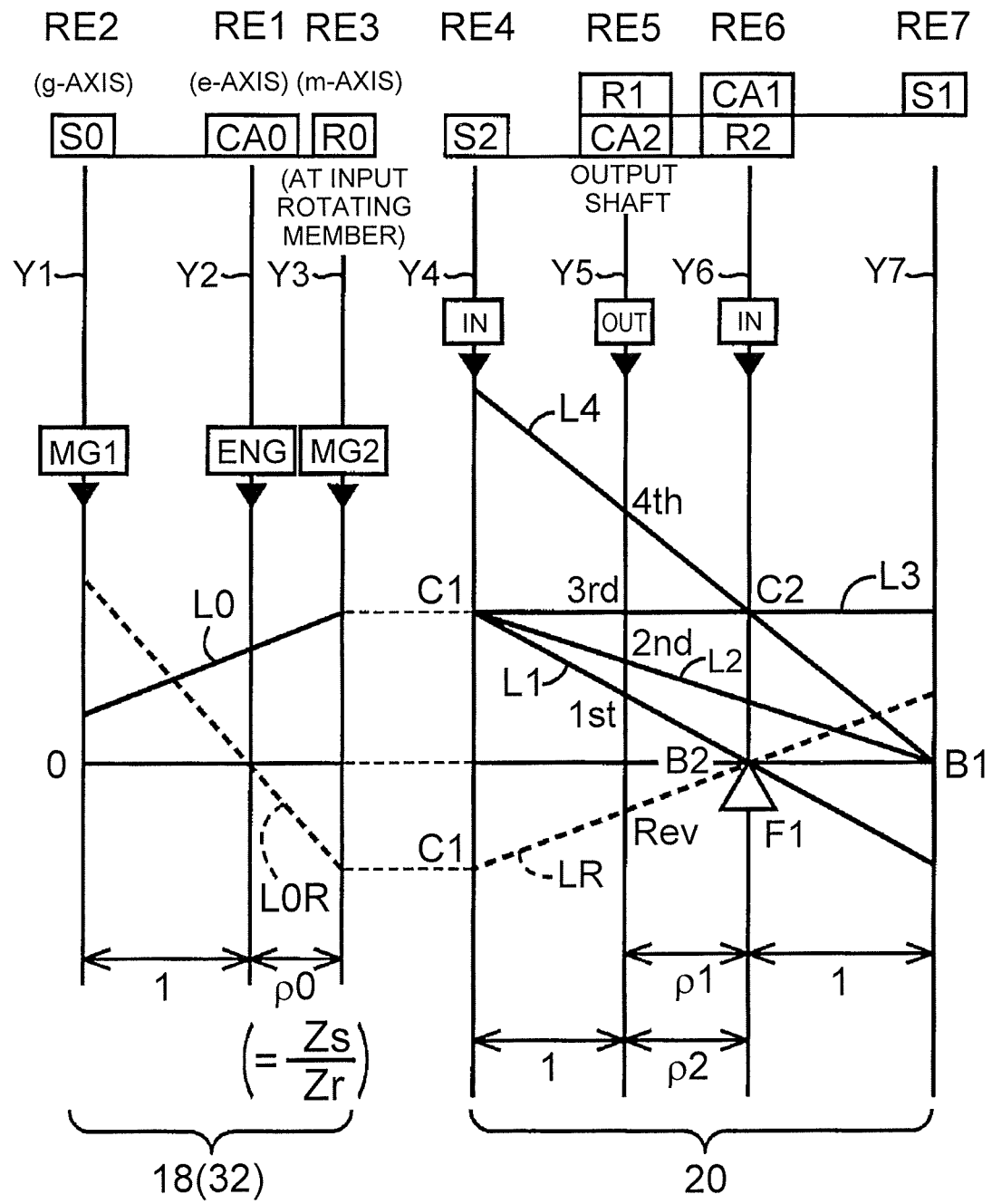
FIG. 3 is a nomograph showing a relative relation of rotating speeds of rotating elements between an electrical stepless transmission unit and the mechanical stepped transmission unit.

FIG. 3 is a nomograph showing a relative relation of the rotating speeds of the rotating elements between the stepless transmission unit 18 and the stepped transmission unit 20. In FIG. 3, three vertical lines Y1, Y2, Y3 corresponding to the three rotating elements of the differential mechanism 32 constituting the stepless transmission unit 18 are a g-axis showing the rotating speed of the sun gear S0 corresponding to a second rotating element RE2, an e-axis showing the rotating speed of the carrier CA0 corresponding to a first rotating element RE1, and an m-axis showing the rotating speed (that is, the input rotating speed of the stepped transmission unit 20) of the ring gear R0 corresponding to a third rotating element RE3, in the order from the left side. Further, four vertical lines Y4, Y5, Y6, Y7 of the stepped transmission unit 20 are an axis showing the rotating speed of the sun gear S2 corresponding to a fourth rotating element RE4, an axis showing the rotating speed (that is, the rotating speed of the output shaft 22) of the mutually coupled ring gear R1 and carrier CA2 corresponding to a fifth rotating element RE5, an axis showing the rotating speed of the mutually coupled carrier CA1 and ring gear R2 corresponding to a sixth rotating element RE6, and an axis showing the rotating speed of the sun gear S1 corresponding to a seventh rotating element RE7, in the order from the left side. Each interval among the vertical lines Y1, Y2, Y3 is decided depending on a gear ratio ρ0 of the differential mechanism 32. Further, each interval among the vertical lines Y4, Y5, Y6, Y7 is decided depending on gear ratios ρ1, ρ2 of the first and second planetary gear devices 36, 38. When the interval between the sun gear and the carrier in the relation among the vertical axes in the nomograph is an interval corresponding to "1", the interval between the carrier and the ring gear is an interval corresponding to a gear ratio ρ (=the number Zs of the teeth of the sun gear/the number Zr of the teeth of the ring gear) of the planetary gear device.

In expression with use of the nomograph of FIG. 3, the differential mechanism 32 of the stepless transmission unit 18 is configured such that the engine 14 (see "ENG" in FIG. 3) is coupled to the first rotating element RE1, the first rotating machine MG1 (see "MG1" in FIG. 3) is coupled to the second rotating element RE2, the second rotating machine MG2 (see "MG2" in FIG. 3) is coupled to the third rotating element RE3 that rotates integrally with the intermediate transmitting member 30, and the rotation of the engine 14 is transmitted to the stepped transmission unit 20 through the intermediate transmitting member 30. In the stepless transmission unit 18, straight lines L0, L0R crossing the vertical line Y2 show a relation between the rotating speed of the sun gear S0 and the rotating speed of the ring gear R0.

In the stepped transmission unit 20, the fourth rotating element RE4 is selectively coupled to the intermediate transmitting member 30 through the clutch C1, the fifth rotating element RE5 is coupled to the output shaft 22, the sixth rotating element RE6 is selectively coupled to the intermediate transmitting member 30 through the clutch C2 and is selectively coupled to the case 16 through the brake B2, and the seventh rotating element RE7 is selectively coupled to the case 16 through the brake B1. In the stepped transmission unit 20, based on an engagement-disengagement control of the engagement device CB, straight lines L1, L2, L3, L4, LR crossing the vertical line Y5 show "1st", "2nd", "3rd", "4th" and "Rev" as rotating speeds of the output shaft 22.

The straight line L0 and the straight lines L1, L2, L3, L4, which are shown by solid lines in FIG. 3, show relative speeds of the rotating elements during forward traveling in a hybrid traveling mode allowing a hybrid traveling in which the vehicle 10 travels using at least the engine 14 as the dynamic power source. In the hybrid traveling mode, in the differential mechanism 32, the engine torque Te is input to the carrier CA0, and a reaction torque that is a negative torque by the first rotating machine MG1 is input to the sun gear S0 with positive rotation, so that an engine direct torque Td (=Te/(1+ρ0)=−(1/ρ0)×Tg) that is a positive torque with positive rotation is generated in the ring gear R0. Then, depending on required driving force, the total torque of the engine direct torque Td and the MG2 torque Tm is transmitted as the driving torque in the forward direction of the vehicle 10, to the driving wheels 28, through the stepped transmission unit 20 that forms one AT gear step of the AT first gear step to the AT fourth gear step. On this occasion, the first rotating machine MG1 functions as an electric generator that generates a negative torque with positive rotation. A generated electric power Wg of the first rotating machine MG1 is stored in the battery 54, or is consumed in the second rotating machine MG2. The second rotating machine MG2 outputs the MG2 torque Tm, using all or some of the generated electric power Wg or using the electric power from the battery 54 in addition to the generated electric power Wg.

In a nomograph for a motor traveling mode allowing a motor traveling in which the vehicle 10 travels using the second rotating machine MG2 as the dynamic power source while the engine 14 is stopped, although the nomograph is not illustrated in FIG. 3, in the differential mechanism 32, the carrier CA0 is not rotated, and the MG2 torque Tm that is a positive torque with positive rotation is input to the ring gear R0. On this occasion, the first rotating machine MG1 coupled to the sun gear S0 is put into a no-load state, and runs idle with negative rotation. That is, in the motor traveling mode, the engine 14 is not driven, the engine speed Ne is set to zero, and the MG2 torque Tm is transmitted as the driving torque in the forward direction of the vehicle 10, to the driving wheels 28, through the stepped transmission unit 20 that forms one AT gear step of the AT first gear step to the AT fourth gear step. Here, the MG2 torque Tm is a motoring torque with positive rotation.

A straight line L0R and a straight line LR, which are shown by broken lines in FIG. 3, show relative speeds of the rotating elements during rearward traveling in the motor traveling mode. During the rearward traveling in the motor traveling mode, the MG2 torque Tm that is a negative torque with negative rotation is input to the ring gear R0, and the MG2 torque Tm is transmitted as the driving torque in the rearward direction of the vehicle 10, to the driving wheels 28, through the stepped transmission unit 20 that forms the AT first gear step. The vehicle 10 can perform the rearward traveling when the later-described electronic control unit 90 causes the second rotating machine MG2 to output the MG2 torque Tm for rearward movement that has the opposite sign of the sign of the MG2 torque Tm for forward movement at the time of forward traveling, for example, in the state of the AT first gear step that is of the plurality of AT gear steps and that is a low-side AT gear step for forward movement. Here, the MG2 torque Tm for forward movement is a motoring torque that is a positive torque with positive rotation, and the MG2 torque Tm for rearward movement is a motoring torque that is a negative torque with negative rotation. Thus, using the AT gear step for forward movement, the vehicle 10 performs the rearward traveling by reversing the sign of the MG2 torque Tm. The use of the AT gear step for forward movement is the use of the same AT gear step as that at the time of forward traveling. The vehicle 10 can perform the rearward traveling also in the hybrid traveling mode, similarly to the motor traveling mode, because the negative rotation of the second rotating machine MG2 can be performed as shown by the straight line L0R.

In the dynamic power transmitting device 12, the stepless transmission unit 18 is configured as an electrical transmission mechanism provided with the differential mechanism 32 including the three rotating elements: the carrier CA0 as the first rotating element RE1 to which the engine 14 is coupled such that dynamic power can be transmitted; the sun gear S0 as the second rotting element RE2 to which the first rotating machine MG1 is coupled such that dynamic power can be transmitted; and the ring gear R0 as the third rotating element RE3 to which the intermediate transmitting member 30 is coupled. In the stepless transmission unit 18, the differential state of the differential mechanism 32 is controlled by controlling the operating state of the first rotating machine MG1. The third rotating element RE3 to which the intermediate transmitting member 30 is coupled can be restated as the third rotating element RE3 to which the second rotating machine MG2 is coupled such that dynamic power can be transmitted. That is, in the dynamic power transmitting device 12, the stepless transmission unit 18 is configured to include the differential mechanism 32 to which the engine 14 is coupled such that dynamic power can be transmitted and the first rotating machine MG1 that is coupled to the differential mechanism 32 such that dynamic power can be transmitted, and to control the differential state of the differential mechanism 32 by controlling the operating state of the first rotating machine MG1. The stepless transmission unit 18 operates as an electrical stepless transmission in which the gear ratio γ0 (=Ne/Nm) is changed. The gear ratio γ0 is the value of the ratio between the engine speed Ne that is the same value as the rotating speed of the coupling shaft 34 as the input rotating member and the MG2 rotating speed Nm that is the rotating speed of the intermediate transmitting member 30 as the output rotating member.

For example, in the hybrid traveling mode, when the rotating speed of the sun gear S0 is increased or decreased by controlling the rotating speed of the first rotating machine MG1, relative to the rotating speed of the ring gear R0 that is restricted by the rotation of the driving wheels 28 due to the formation of the AT gear step in the stepped transmission unit 20, the rotating speed of the carrier CA0, that is, the engine speed Ne is increased or decreased. Accordingly, in the hybrid traveling, the engine 14 can operate at an efficient operating point. That is, the stepped transmission unit 20 that forms the AT gear step and the stepless transmission unit 18 that operates as a stepless transmission can constitute a stepless transmission as the whole of the composite transmission 40 in which the stepless transmission unit 18 and the stepped transmission unit 20 are disposed in series.

Further, the stepless transmission unit 18 can perform the gear shift in a similar way to a stepped transmission. Therefore, the stepped transmission unit 20 that forms the AT gear step and the stepless transmission unit 18 that performs the gear shift in a similar way to a stepped transmission can perform the gear shift in a similar way to a stepped transmission, as the whole of the composite transmission 40. That is, in the composite transmission 40, it is possible to control the stepped transmission unit 20 and the stepless transmission unit 18, such that one of a plurality of gear steps having different gear ratios γt (=Ne/No) each of which shows the value of the ratio of the engine speed Ne to the output rotating speed No is selectively established. In the embodiment, the gear step established in the composite transmission 40 is referred to as a simulated gear step. The gear ratio γt is a total gear ratio formed in the stepless transmission unit 18 and the stepped transmission unit 20, which are disposed in series, and is the value (γt=γ0×γat) resulting from multiplying the gear ratio γ0 of the stepless transmission unit 18 and the gear ratio γat of the stepped transmission unit 20.

The simulated gear step is assigned such that a single or a plurality of kinds of simulated gear steps are established for each AT gear step of the stepped transmission unit 20, for example, by the combination of the AT gear step of the stepped transmission unit 20 and a single or a plurality of gear ratios γ0 of the stepless transmission unit 18. For example, the simulated gear step is previously decided such that a simulated first gear step to a simulated third gear step are established for the AT first gear step, a simulated fourth gear step to a simulated sixth gear step are established for the AT second gear step, a simulated seventh gear step to a simulated ninth gear step are established for the AT third gear step, and a simulated tenth gear step is established for the AT fourth gear step. In the composite transmission 40, the stepless transmission unit 18 is controlled such that the engine speed Ne is an engine speed Ne to realize a predetermined gear ratio γt with respect to the output rotating speed No, and thereby, different simulated gear steps are established at a certain AT gear step. Further, in the composite transmission 40, the stepless transmission unit 18 is controlled in response to the switching of the AT gear step, and thereby, the simulated gear step is switched.

Back to FIG. 1, the vehicle 10 includes the electronic control unit 90 as a controller including a control device for the vehicle 10 that is related to controls of the engine 14, the stepless transmission unit 18, the stepped transmission unit 20, and the like. Therefore, FIG. 1 is a diagram showing input and output systems of the electronic control unit 90, and is a functional block diagram for describing a principal part of a control function of the electronic control unit 90. The electronic control unit 90 is configured to include a so-called microcomputer having a CPU, a RAM, a ROM and an input-output interface, for example. The CPU executes various controls for the vehicle 10, by performing signal processing in accordance with programs previously stored in the ROM, while using a temporary storage function of the RAM. As necessary, the electronic control unit 90 is configured to be divided into a device for engine control, a device for gear shift control, and the like.

The electronic control unit 90 receives various signals and the like (for example, the engine speed Ne, the output rotating speed No corresponding to the vehicle speed V, the MG1 rotating speed Ng that is the rotating speed of the first rotating machine MG1, the MG2 rotating speed Nm that is the AT input rotating speed Ni, an accelerator operation amount θacc as an acceleration operation amount by the driver that indicates the magnitude of the acceleration operation by the driver, a throttle valve opening degree θth that is the opening degree of an electronic throttle valve, a brake-on signal Bon as a signal indicating a state where a brake pedal for actuating a wheel brake is being operated by the driver, a brake operation amount Bra indicating the magnitude of stepping operation of the brake pedal by the driver and corresponding to pedal force of the brake pedal, a steering angle θsw and a steering direction Dsw of a steering wheel included in the vehicle 10, a front-rear acceleration Gx of the vehicle 10, a right-left acceleration Gy of the vehicle 10, a yaw rate Ryaw that is a turning angle velocity about a vertical axis of the vehicle 10, a battery temperature THbat, a battery charge-discharge current Ibat and a battery voltage Vbat of the battery 54, a hydraulic oil temperature THoil as the temperature of a hydraulic oil that is supplied to the hydraulic actuator of the engagement device CB, that is, a hydraulic oil that operates the engagement device CB, vehicle surrounding information Iard, a GPS signal (orbit signal) Sgps, a communication signal Scom, navigation information Inavi, and a driving assist setting signal Sset that is a signal indicating setting by the driver in a driving assist control such as an automatic driving control and a cruise control) based on detection values of various sensors and the like (for example, an engine speed sensor 60, an output rotating speed sensor 62, an MG1 rotating speed sensor 64, an MG2 rotating speed sensor 66, an accelerator operation amount sensor 68, a throttle valve opening degree sensor 70, a brake pedal sensor 71, a steering sensor 72, a G sensor 74, a yaw rate sensor 76, a battery sensor 78, an oil temperature sensor 79, a vehicle surrounding information sensor 80, a GPS antenna 81, an external network communication antenna 82, a navigation system 83, and a driving assist setting switch group 84) included in the vehicle 10.

For example, the acceleration operation amount by the driver that indicates the magnitude of the acceleration operation by the driver is an accelerator operation amount that is an operation amount of an accelerator operation member such as an accelerator pedal, and is a required output amount of the vehicle 10 by the driver. As the required output amount by the driver, the throttle valve opening degree θth or the like can be used, other than the accelerator operation amount θacc.

For example, the vehicle surrounding information sensor 80 includes at least one of a LIDAR, a radar, an in-vehicle camera and the like, and directly acquires information relevant to a road on which the vehicle is traveling and information relevant to a physical object surrounding the vehicle. For example, the LIDAR is constituted by a plurality of LIDARs that respectively detect a physical object positioned forward of the vehicle 10, a physical object positioned lateral to the vehicle 10 and a physical object positioned rearward of the vehicle 10, or by a single LIDAR that detects physical objects positioned in an all-directional periphery of the vehicle 10, and outputs physical information relevant to the detected physical object, as the vehicle surrounding information Iard. For example, the radar is constituted by a plurality of radars that respectively detect a physical object positioned forward of the vehicle 10, a physical object positioned nearly forward of the vehicle 10 and a physical object positioned nearly rearward of the vehicle 10, and outputs physical information relevant to the detected physical object, as the vehicle surrounding information Iard. The physical information of the LIDAR or the radar includes the distance and direction of the detected physical object from the vehicle 10. For example, the in-vehicle camera is a monocular camera or stereo camera that is provided on the back of a windshield of the vehicle 10 and that picks up a forward view of the vehicle 10, and outputs pickup information as the vehicle surrounding information Iard. The pickup information includes information about a lane of the traveling road, a traffic sign on the traveling road, and another vehicle, a pedestrian, an obstacle and the like on the traveling road.

The driving assist setting switch group 84 includes an automatic driving selection switch for executing the automatic driving control, a cruise switch for executing the cruise control, a switch for setting the vehicle speed in the cruise control, a switch for setting the inter-vehicle distance from a leading vehicle in the cruise control, a switch for executing a lane keeping control by which the vehicle 10 travels so as to keep a set lane, and the like.

The GPS signal Sgps includes own-vehicle position information indicating the position of the vehicle 10 on the ground or a map based on signals sent from global positioning system (GPS) satellites.

For example, the communication signal Scom includes road traffic information sent to or received from a center that is a vehicle exterior device such as a server and a road traffic information communication system, and/or inter-vehicle communication information sent to or received from another vehicle near the vehicle 10 directly without the center. For example, the road traffic information includes information about a road congestion, an accident, a construction, a necessary time, a parking place and the like. For example, the inter-vehicle communication information includes vehicle information, traveling information, traffic environment information and the like. For example, the vehicle information includes information indicating a vehicle type such as a passenger vehicle, a truck and a two-wheel vehicle. For example, the traveling information includes information such as the vehicle speed V, position information, operation information about the brake pedal, blinking information about a turn signal lamp and blinking information about a hazard lamp. For example, the traffic environment information includes information such as a road congestion and a construction.

For example, the navigation information Inavi includes map information such as road information and facility information based on map data previously stored in the navigation system 83. The road information includes information such as road type including an urban road, a suburban road, a mountain road and an automobile expressway, that is, an expressway, road branching or merging, road gradient, and limiting speed. The facility information includes information such as base type including a supermarket, a shop, a restaurant, a parking place, a park, a base for repairing the vehicle 10, a home and a service area on an expressway, location and name. For example, the service area is a base on an expressway that has equipment for parking, eating, refueling and the like.

The navigation system 83 is a known navigation system including a display, a speaker and the like. The navigation system 83 identifies the position of the vehicle 10 on the previously stored map data, based on the GPS signal Sgps. The navigation system 83 displays the position of the vehicle 10 on a map displayed on the display. When a destination is input, the navigation system 83 computes a traveling route from the departure place to the destination, and gives an instruction of the traveling route and the like to the driver through the display, the speaker and the like.

The electronic control unit 90 outputs various command signals (for example, an engine control command signal Se for controlling the engine 14, a rotating machine control command signal Smg for controlling each of the first rotating machine MG1 and the second rotating machine MG2, a hydraulic control command signal Sat for controlling the operation state of the engagement device CB, the communication signal Scom, a brake control command signal Sbra for controlling the braking torque of the wheel brake, a steering control command signal Sste for controlling the steering of wheels (particularly, front wheels), and an information announcement control command signal Sinf for giving a warning or a notice to the driver), to devices (for example, the engine control device 50, the inverter 52, the hydraulic control circuit 56, the external network communication antenna 82, a wheel brake device 86, a steering device 88, and an information announcement device 89) included in the vehicle 10.

The wheel brake device 86 is a brake device that gives the braking torque of the wheel brake to the wheel. The wheel brake device 86 supplies a brake hydraulic pressure to a wheel cylinder provided on the wheel brake, for example, in response to the stepping operation of the brake pedal by the driver. At normal times, in the wheel brake device 86, a master cylinder hydraulic pressure generated from a brake master cylinder and having a magnitude corresponding to the pedal force of the brake pedal is supplied directly to the wheel cylinder as the brake hydraulic pressure. On the other hand, for example, at the time of an ABS control, a sideslip prevention control, a vehicle speed control, the automatic driving control or the like, in the wheel brake device 86, a brake hydraulic pressure necessary for each control is supplied to the wheel cylinder, for the generation of the braking torque of the wheel brake. The wheels include the driving wheels 28 and unillustrated driven wheels.

For example, the steering device 88 gives an assist torque corresponding to the vehicle speed V, the steering angle θsw, the steering direction Dsw, the yaw rate Ryaw and the like, to a steering system of the vehicle 10. For example, at the time of the automatic driving control or the like, the steering device 88 gives the torque for controlling the steering of the front wheels, to the steering system of the vehicle 10.

The information announcement device 89 is a device that gives a warning or a notice to the driver, for example, in the case of failure of some kind of a component relevant to the driving of the vehicle 10 or in the case of deterioration in the function of the component. For example, the information announcement device 89 is constituted by a display device such as a monitor, a display and an alarm lamp and/or a sound output device such as a speaker and a buzzer. The display device is a device that gives a visual warning or notice to the driver. The sound output device is a device that gives an auditory warning or notice to the driver.

For example, the electronic control unit 90 calculates a state-of-charge SOC [%] as a value indicating a charge state of the battery 54, based on the battery charge-discharge current Ibat and the battery voltage Vbat. Further, for example, the electronic control unit 90 calculates chargeable and dischargeable electric powers Win, Wout for specifying a range in which a battery power Pbat that is a power of the battery 54 can be used, based on the battery temperature THbat and the state-of-charge SOC of the battery 54. The chargeable and dischargeable electric powers Win, Wout are a chargeable electric power Win as an input-capable electric power for specifying the limit of electric power that is input to the battery 54, and a dischargeable electric power Wout as an output-capable electric power for specifying the limit of electric power that is output from the battery 54. For example, in a low-temperature range in which the battery temperature THbat is lower than a regular use range, the chargeable and dischargeable electric powers Win, Wout are lower as the battery temperature THbat is lower. Further, in a high-temperature range in which the battery temperature THbat is higher than the regular use range, the chargeable and dischargeable electric powers Win, Wout are higher as the battery temperature THbat is higher. Further, for example, in a range in which the state-of-charge SOC is high, the chargeable electric power Win is lower as the state-of-charge SOC is higher. Further, for example, in a range in which the state-of-charge SOC is low, the dischargeable electric power Wout is lower as the state-of-charge SOC is lower.

For realizing various controls in the vehicle 10, the electronic control unit 90 includes a driving control unit 91 as driving control means, an AT gear shift control unit 92 as AT gear shift control means, and a hybrid control unit 93 as hybrid control means.

The driving control unit 91 can selectively perform a manual driving control and the automatic driving control, as the driving control for the vehicle 10. In the manual driving control, the vehicle 10 travels based on the driving operation by the driver. In the automatic driving control, the vehicle 10 travels by automatically setting a target traveling state based on the destination input by the driver, the map information and the like and automatically performing the acceleration or deceleration and the steering based the target traveling state. The manual driving control is a driving control for traveling by manual driving based on the driver's driving operation. The manual driving is a driving method of performing a normal traveling of the vehicle 10 by the driver's driving operation such as accelerator operation, brake operation and steering operation. The automatic driving control is a driving control for traveling by automatic driving. The automatic driving is a driving method of performing the traveling of the vehicle 10 by automatically performing the acceleration or deceleration, the braking, the steering and the like under control by the electronic control unit 90 based on signals, information and the like from various sensors, without depending on the driver's driving operation (intension).

In the case where the automatic driving is not selected in the automatic driving selection switch of the driving assist setting switch group 84, the driving control unit 91 adopts a manual driving mode, and executes the manual driving control. The driving control unit 91 executes the manual driving control, by outputting commands for controlling the stepped transmission unit 20, the engine 14 and the rotating machines MG1, MG2, to the AT gear shift control unit 92 and the hybrid control unit 93.

In the case where the driver selects the automatic driving by operating the automatic driving selection switch of the driving assist setting switch group 84, the driving control unit 91 adopts an automatic driving mode, and executes the automatic driving control. Specifically, the driving control unit 91 automatically sets the target traveling state, on the basis of a variety of setting such as the destination input by the driver, fuel efficiency priority, the vehicle speed and the inter-vehicle distance, the own-vehicle position information based on the GPS signal Sgps, the map information such as road condition including a curve, gradient, altitude and legal speed limit, infrastructure information, weather and the like, which are based on the navigation information Inavi and/or the communication signal Scorn, and information such as the lane of the traveling road, the traffic sign on the traveling road and another vehicle, a pedestrian and the like on the traveling road, which is based on the vehicle surrounding information Iard. The driving control unit 91 performs the automatic driving control by automatically performing the acceleration or deceleration, the braking and the steering based on the set target traveling state. The acceleration or deceleration is the acceleration of the vehicle 10 or the deceleration of the vehicle 10. The deceleration herein may include the braking.

As the target traveling state, the driving control unit 91 sets a target route, a target course, a target vehicle speed for which a safety margin based on the actual inter-vehicle distance is considered, and a target driving torque or target acceleration or deceleration based on the target vehicle speed, traveling resistance and the like. As the traveling resistance, for example, there is used a value previously set to the vehicle 10 by the driver, a value based on the map information acquired by communication with the exterior of the vehicle 10 and vehicle dimensions, or an estimated value computed during traveling based on the gradient, the actual driving amount, the actual front-rear acceleration Gx and the like. The driving control unit 91 outputs the commands for controlling the stepped transmission unit 20, the engine 14 and the rotating machines MG1, MG2, to the AT gear shift control unit 92 and the hybrid control unit 93, such that the target driving torque is obtained. In the case where the target driving torque is a negative value (that is, in the case where the braking torque is necessary), at least one brake torque of engine brake torque of the engine 14, regenerative brake torque of the second rotating machine MG2 and wheel brake torque of the wheel brake device 86 is applied to the vehicle 10. For example, the driving control unit 91 computes the wheel brake torque in a usable range, and outputs the brake control command signal Sbra for applying the wheel brake torque, to the wheel brake device 86, such that the target driving torque is obtained. In addition, the driving control unit 91 outputs the steering control command signal Sste for controlling the steering of the front wheels based on the set target traveling state, to the steering device 88.

Controls by the AT gear shift control unit 92 and the hybrid control unit 93 will be specifically described below, using the case of the manual driving control of the normal traveling as an example.

Figure 4:
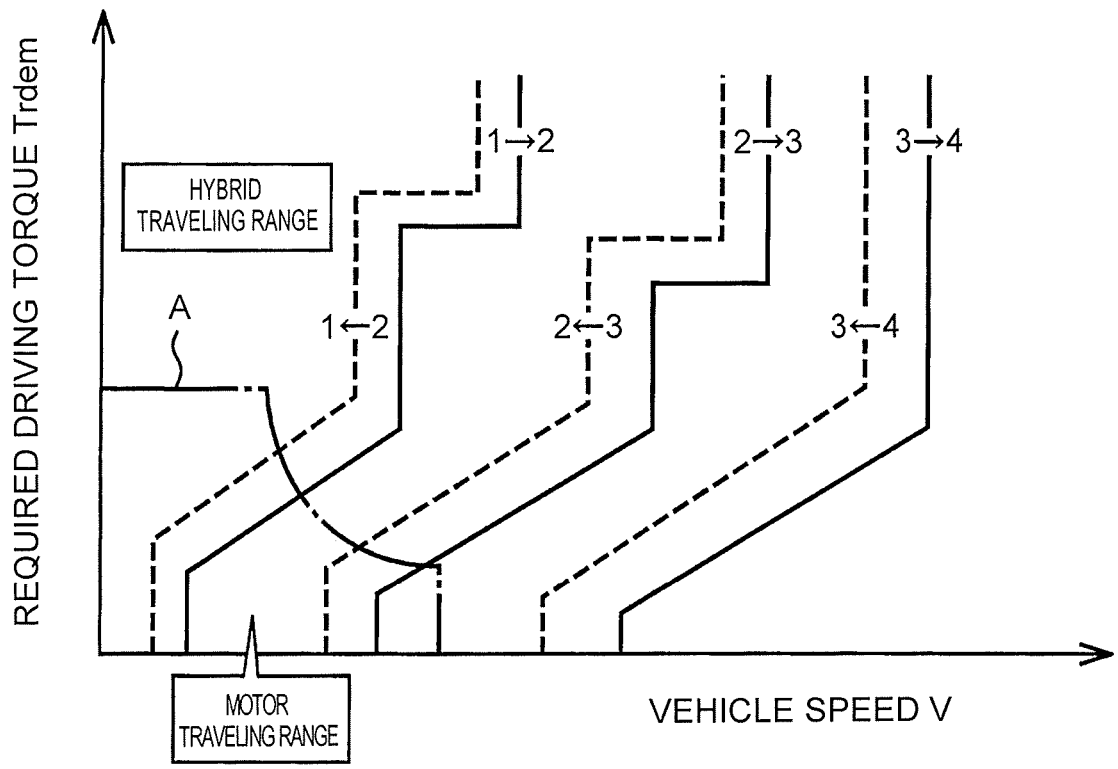
FIG. 4 is a diagram showing an example of a gear shift map to be used in a gear shift control of the stepped transmission unit and an example of a dynamic power source switching map to be used in a switching control between a hybrid traveling and a motor traveling, and is a diagram showing a relation between the gear shift map and the dynamic power source switching map.

The AT gear shift control unit 92 performs a gear shift determination for the stepped transmission unit 20, for example, using an AT gear shift map shown in FIG. 4, which is a relation previously evaluated from an experiment or design and stored (that is, a previously decided relation), and executes the gear shift control of the stepped transmission unit 20, as necessary. In the gear shift control of the stepped transmission unit 20, the AT gear shift control unit 92 outputs the hydraulic control command signal Sat for switching the engagement-disengagement state of the engagement device CB with the solenoid valves SL1 to SL4, to the hydraulic control circuit 56, such that the AT gear step of the stepped transmission unit 20 is automatically switched. For example, the AT gear shift map shows a predetermined relation in which gear shift lines for determining the gear shift of the stepped transmission unit 20 are provided on two-dimensional coordinates having the vehicle speed V and a required driving torque Trdem as variables. Here, the output rotating speed No or the like may be used instead of the vehicle speed V, and a required driving force Frdem, the accelerator operation amount θacc, the throttle valve opening degree θth or the like may be used instead of the required driving torque Trdem. The gear shift lines in the AT gear shift map include upshift lines for determining upshift, which are shown by solid lines, and downshift lines for determining downshift, which are shown by broken lines.

The hybrid control unit 93 has a function as engine control means (that is, an engine control unit) for controlling the operation of the engine 14 and a function as rotating machine control means (that is, a rotating machine control unit) for controlling the operation of the first rotating machine MG1 and the second rotating machine MG2 through the inverter 52, and executes a hybrid driving control and the like with the engine 14, the first rotating machine MG1 and the second rotating machine MG2, using the control functions. The hybrid control unit 93 calculates the required driving torque Trdem [Nm] of the driving wheel 28 as the required driving amount, by applying the accelerator operation amount θacc and the vehicle speed V, for example, to a required driving amount map that shows a previously decided relation. As the required driving amount, the required driving force Frdem [N] of the driving wheel 28, a required driving power Prdem [W] of the driving wheel 28, a required AT output torque of the output shaft 22, or the like can be used other than the required driving torque Trdem. The target driving torque in the automatic driving control is equivalent to the required driving torque in the manual driving control.

In consideration of the chargeable and dischargeable electric powers Win, Wout of the battery 54 and the like, the hybrid control unit 93 outputs the engine control command signal Se that is a command signal for controlling the engine 14 and the rotating machine control command signal Smg that is a command signal for controlling the first rotating machine MG1 and the second rotating machine MG2, such that the required driving power Prdem is realized. For example, the engine control command signal Se is a command value of an engine power Pe that is a power of the engine 14 for outputting the engine torque Te at the engine speed Ne at that time. For example, the rotating machine control command signal Smg is a command value of the generated electric power Wg of the first rotating machine MG1 for outputting the MG1 torque Tg at the MG1 rotating speed Ng at the time of the output of the command as the reaction torque of the engine torque Te, and is a command value of a consumed electric power Wm of the second rotating machine MG2 for outputting the MG2 torque Tm at the MG2 rotating speed Nm at the time of the command output.

For example, in the case where the stepless transmission unit 18 operates as a stepless transmission and the whole of the composite transmission 40 operates as a stepless transmission, the hybrid control unit 93, in consideration of an engine optimal fuel efficiency point and the like, controls the engine 14 and the generated electric power Wg of the first rotating machine MG1, so as to give the engine speed Ne and the engine torque Te for obtaining the engine power Pe that realizes the required driving power Prdem. Thereby, the hybrid control unit 93 executes the stepless gear shift control of the stepless transmission unit 18, and changes the gear ratio γ0 of the stepless transmission unit 18. As a result of this control, the gear ratio γt of the composite transmission 40 in the case of the operation as a stepless transmission is controlled.

For example, in the case where the stepless transmission unit 18 performs the gear shift in a similar way to a stepped transmission and the whole of the composite transmission 40 performs the gear shift in a similar way to a stepped transmission, the hybrid control unit 93 performs a gear shift determination for the composite transmission 40, for example, using a simulated gear shift map that is a previously decided relation. Then, the hybrid control unit 93 executes the gear shift control of the stepless transmission unit 18 such that one of the plurality of simulated gear steps is selectively established, in cooperation with the gear shift control of the AT gear step of the stepped transmission unit 20 by the AT gear shift control unit 92. The plurality of simulated gear steps can be established when the first rotating machine MG1 controls the engine speed Ne depending on the vehicle speed V such that the respective gear ratios γt can be kept. The gear ratio γt of each simulated gear step does not always need to be a constant value over the whole range of the vehicle speed V, and may be changed in a predetermined range, or may be restricted, for example, by an upper limit or lower limit of the rotating speed of each part. Thus, the hybrid control unit 93 can perform the gear shift control for changing the engine speed Ne in a similar way to the stepped gear shift. The simulated stepped gear shift control by which the whole of the composite transmission 40 performs the gear shift in a similar way to a stepped transmission may be executed in preference to the stepless gear shift control by which the whole of the composite transmission 40 operates as a stepless transmission, only in the case where the driver selects a traveling mode in which traveling performance is important, as exemplified by a sport traveling mode, or in the case where the required driving torque Trdem is relatively high, for example. However, the simulated stepped gear shift control may be basically executed, other than the time of a predetermined execution restriction.

The hybrid control unit 93 selectively adopts the motor traveling mode or the hybrid traveling mode, as the traveling mode, depending on the traveling state. For example, in the case where the required driving power Prdem is in a motor traveling range in which the required driving power Prdem is lower than a previously decided threshold, the hybrid control unit 93 adopts the motor traveling mode. On the other hand, in the case where the required driving power Prdem is in a hybrid traveling range in which the required driving power Prdem is equal to or higher than the previously decided threshold, the hybrid control unit 93 adopts the hybrid traveling mode. A dashed-dotted line A in FIG. 4 is a border line for switching the dynamic power source for the traveling of the vehicle 10 between at least the engine 14 and only the second rotating machine MG2. That is, the dashed-dotted line A in FIG. 4 is a border line between the hybrid traveling range and the motor traveling range for the switching between the hybrid traveling and the motor traveling. The previously decided relation having the border line shown by the dashed-dotted line A in FIG. 4 is an exemplary dynamic power source switching map configured by two-dimensional coordinates having the vehicle speed V and the required driving torque Trdem as variables. In FIG. 4, for convenience, the dynamic power source switching map is shown together with the AT gear shift map.

In the case where the state-of-charge SOC of the battery 54 is lower than a previously decided engine start threshold, the hybrid control unit 93 adopts the hybrid traveling mode, even when the required driving power Prdem is in the motor traveling range. The motor traveling mode provides a traveling state in which the vehicle 10 travels while the engine 14 is stopped and the second rotating machine MG2 generates the driving torque. The hybrid traveling mode provides a traveling state in which the vehicle 10 travels while the engine 14 operates. The engine start threshold is a threshold that is previously decided for determining whether the state-of-charge SOC is a value at which it is necessary to charge the battery 54 by forcibly starting the engine 14.

In the case where the vehicle state transitions from the motor traveling range to the hybrid traveling range or the state-of-charge SOC decreases to lower than the engine start threshold during the stop of the operation of the engine 14, the hybrid control unit 93 adopts the hybrid traveling mode, and performs a start control for starting the engine 14. For the ignition of the engine 14, the hybrid control unit 93 starts the engine 14 by increasing the engine speed Ne with the first rotating machine MG1 and performing the ignition when the engine speed Ne becomes equal to or higher than a predetermined engine speed allowing the ignition. That is, the hybrid control unit 93 starts the engine 14 by cranking the engine 14 with the first rotating machine MG1.

Here, during the execution of the automatic driving control, the electronic control unit 90 predicts that the engine start control as the start control of the engine 14 and the AT gear shift control as the gear shift control of the stepped transmission unit 20 will be concurrently executed in a future traveling, based on the setting of the target traveling state such as the target route and the target driving torque. The electronic control unit 90 executes the engine start control and the AT gear shift control in turn, based on the prediction of the concurrent execution of the engine start control and the AT gear shift control. This control is not a control of executing the engine start control and the AT gear shift control in turn after an actual occurrence of the concurrent execution of the engine start control and the AT gear shift control, and therefore, it is possible to advance and execute one control of the engine start control and the AT gear shift control relative to a period during which the engine start control and the AT gear shift control are concurrently executed actually. That is, it is possible to avoid one control, of the engine start control and the AT gear shift control, being executed late in the same way relative to the period during which the engine start control and the AT gear shift control are concurrently executed actually.

Specifically, for realizing the control function to avoid one control, of the engine start control and the AT gear shift control, being executed late in the same way relative to the period during which the engine start control and the AT gear shift control are concurrently executed actually, the electronic control unit 90 further includes state determination means (that is, a state determination unit 94), concurrent execution prediction means (that is, a concurrent execution prediction unit 96), and sequence processing means (that is, a sequence processing unit 98).

The state determination unit 94 determines whether the vehicle 10 has been set to the automatic driving mode, based on whether the automatic driving mode has been adopted by the driving control unit 91.

In the case where the state determination unit 94 determines that the vehicle 10 has been set to the automatic driving mode, the concurrent execution prediction unit 96 calculates a change manner of a predicted value of the target driving torque and a change manner of a predicted value of the state-of-charge SOC of the battery 54 in a predetermined period from the current hour to an hour after a predetermined time, based on the target route set by the driving control unit 91 and the target traveling state such as the target driving torque and the target vehicle speed. The predetermined time is a previously decided time from the current time point for which it is thought that the predicted value can be calculated in a range in which the difference from the actual value at the same hour is a permissible difference.

The concurrent execution prediction unit 96 determines whether a situation requiring the engine start control will occur in the predetermined period, that is, whether the engine start control will be needed in the predetermined period, based on the calculated change manner of the predicted value of the target driving torque and the calculated change manner of the predicted value of the state-of-charge SOC of the battery 54 in the predetermined period. In the determination of whether the engine start control will be needed, for example, the dynamic power source switching map and the engine start threshold are used.

The concurrent execution prediction unit 96 predicts the occurrence of the AT gear shift control in the predetermined period, based on the calculated change manner of the predicted value of the target driving torque in the predetermined period. In the prediction of the occurrence of the AT gear shift control, for example, the AT gear shift map is used.

The concurrent execution prediction unit 96 predicts that the engine start control and the AT gear shift control will be concurrently executed, based on the determination result of whether the engine start control will be needed in the predetermined period and the prediction of the occurrence of the AT gear shift control in the predetermined period. That is, during the execution of the automatic driving control by the driving control unit 91, the concurrent execution prediction unit 96 determines whether there is a possibility that the engine start control and the AT gear shift control will be concurrently executed in the future traveling under the automatic driving control.

During the execution of the automatic driving control, in the case where the concurrent execution prediction unit 96 determines that the engine start control will not be needed in the predetermined period, the driving control unit 91 outputs, for example, a command to execute the normal gear shift of the stepped transmission unit 20 using the AT gear shift map, to the AT gear shift control unit 92.

During the execution of the automatic driving control, in the case where the concurrent execution prediction unit 96 determines that the engine start control will be needed in the predetermined period and predicts the occurrence of the AT gear shift control in the predetermined period and where the concurrent execution prediction unit 96 determines there is no possibility that the engine start control and the AT gear shift control will be concurrently executed, the driving control unit 91 outputs, for example, a command to execute the engine start control determined using the dynamic power source switching map and the engine start threshold at the timing of the determination, to the hybrid control unit 93, and outputs, for example, the command to execute the normal gear shift of the stepped transmission unit 20 using the AT gear shift map, to the AT gear shift control unit 92.

In the case where the concurrent execution prediction unit 96 determines that there is a possibility that the engine start control and the AT gear shift control will be concurrently executed in the future traveling under the automatic driving control, the sequence processing unit 98 outputs a command to first execute one control of the engine start control and the AT gear shift control in the future traveling under the automatic driving control and execute the other control after the one control finishes, to the AT gear shift control unit 92 and the hybrid control unit 93.

In a sequence process of executing the engine start control and the AT gear shift control in turn such that an execution period of the engine start control and an execution period of the AT gear shift control do not overlap, in consideration of acceleration responsiveness, it is preferable to first execute one control such that the one control finishes before a period in which the execution periods can overlap, and execute the other control at a normal timing. Further, when the engine start control is first executed, it is easier to increase the driving torque rapidly than when the AT gear shift control is first executed.

In the case where the concurrent execution prediction unit 96 determines that there is a possibility that the engine start control and the AT gear shift control will be concurrently executed in the future traveling under the automatic driving control, the state determination unit 94 determines whether the engine start control can be first executed such that the engine start control finishes before the period in which the execution period of the engine start control and the execution period of the AT gear shift control can overlap (that is, whether the engine start control can be advanced).

In the case where the concurrent execution prediction unit 96 determines that there is a possibility that the engine start control and the AT gear shift control will be concurrently executed in the future traveling under the automatic driving control and where the state determination unit 94 determines that the engine start control can be advanced, the sequence processing unit 98 outputs a command to execute the engine start control such that the engine start control finishes before an execution start time point of the AT gear shift control when it is determined that there is a possibility that the engine start control and the AT gear shift control will be concurrently executed, to the hybrid control unit 93, and outputs, for example, the command to execute the normal gear shift of the stepped transmission unit 20 using the AT gear shift map, to the AT gear shift control unit 92.

Figure 5:
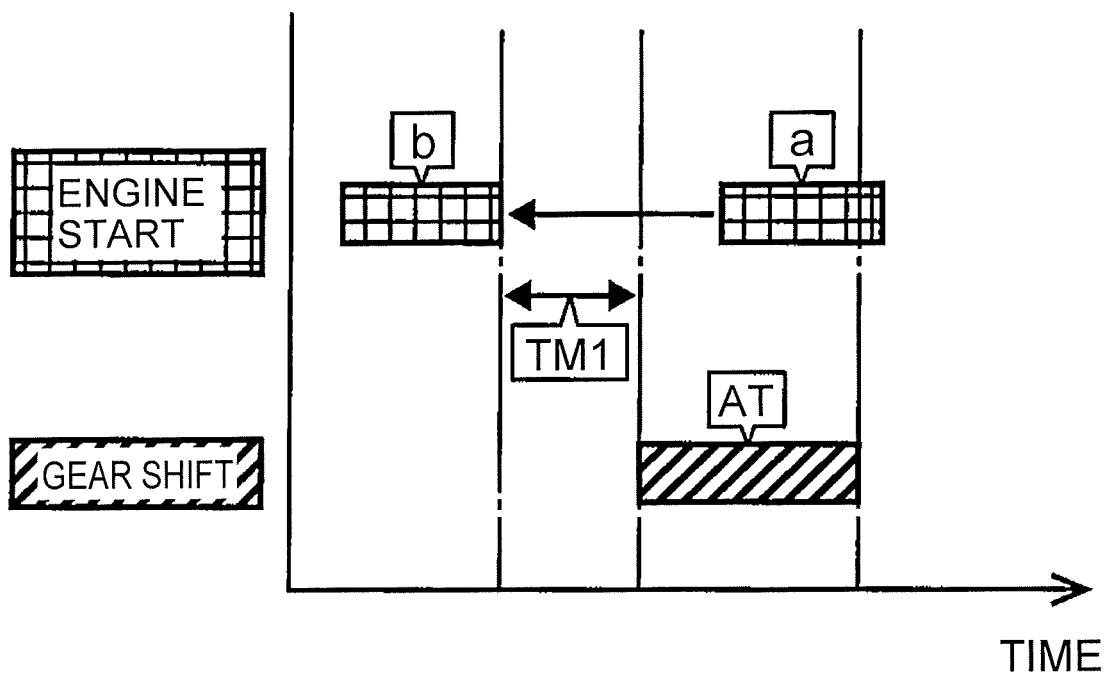
FIG. 5 is a diagram for describing an example of the case where an engine start control is advanced relative to an AT gear shift control.

FIG. 5 is a diagram for describing an example of the case where the engine start control is advanced relative to the AT gear shift control. In FIG. 5, when the AT gear shift control is executed at a normal timing shown by "AT" and the engine start control is executed at a normal timing shown by "a", the AT gear shift control and the engine start control are concurrently executed. In this case, the engine start control is advanced so as to be executed at a timing shown by "b". A period TM1 in FIG. 5 is a time for surely avoiding the concurrent execution of the AT gear shift control and the engine start control in consideration of variability in the engine start control. Further, when the engine 14 is started excessively early, there is concern of deterioration in fuel efficiency. The period TM1 in FIG. 5 is also a time for preventing an excessive advance of the engine start control.

In the case where the concurrent execution prediction unit 96 determines that there is a possibility that the engine start control and the AT gear shift control will be concurrently executed in the future traveling under the automatic driving control and where the state determination unit 94 determines that the engine start control cannot be advanced, the sequence processing unit 98 outputs a command to execute the AT gear shift control such that the AT gear shift control finishes before an execution start time point of the engine start control when it is determined that there is a possibility that the engine start control and the AT gear shift control will be concurrently executed, to the AT gear shift control unit 92, and outputs a command to execute the engine start control at a normal timing, using the dynamic power source switching map and the engine start threshold, to the hybrid control unit 93. Also in the case where the AT gear shift control is executed such that the AT gear shift control finishes before the execution start time point of the engine start control, that is, in the case where the AT gear shift control is advanced, it is preferable to provide a period similar to the period TM1 when the engine start control is advanced.

Figure 6:
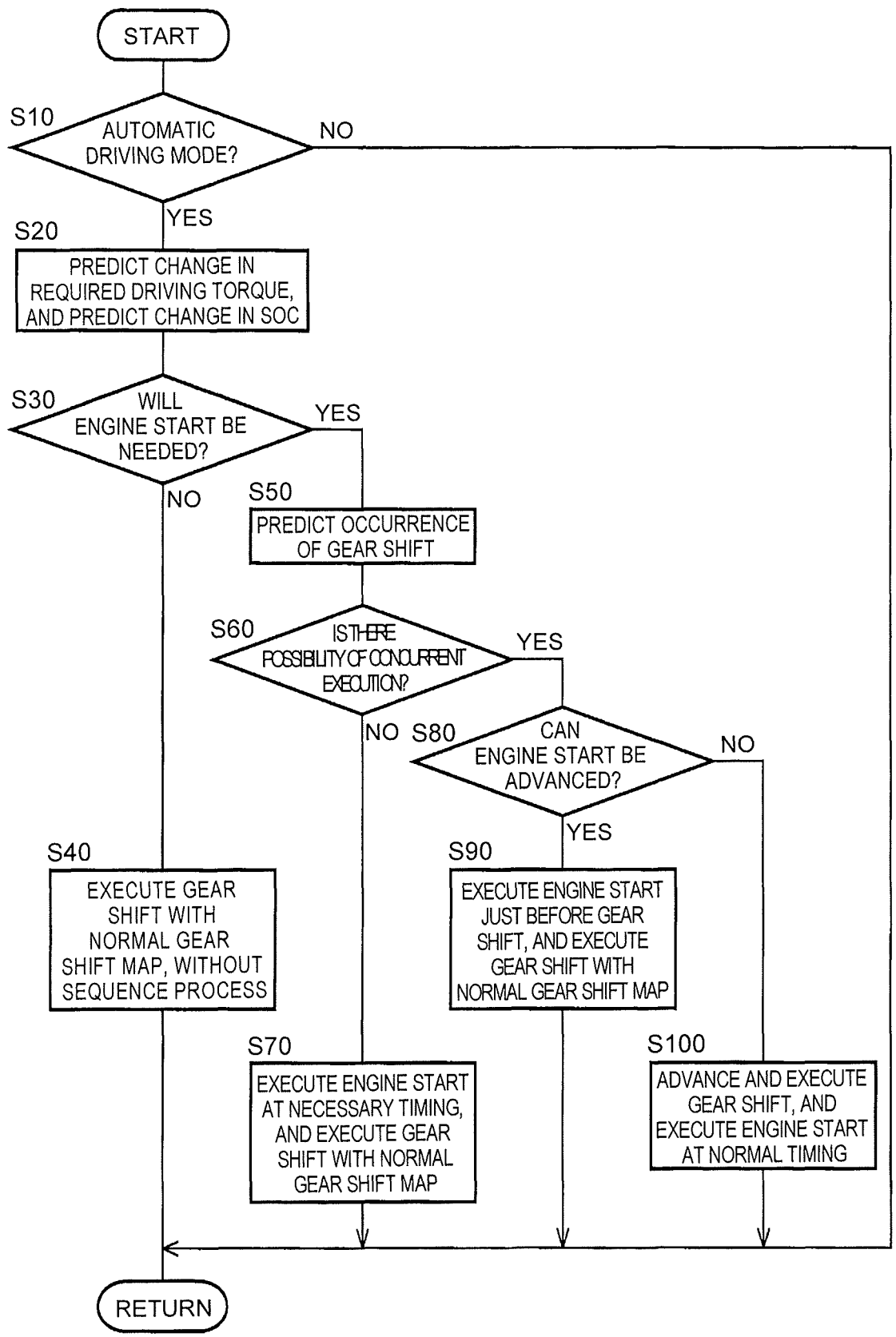
FIG. 6 is a flowchart for describing a control operation for avoiding one control, of the engine start control and the AT gear shift control, being executed late in the same way relative to a period during which the engine start control and the AT gear shift control are concurrently executed actually in traveling by a principal part of a control operation of an electronic control unit, that is, an automatic driving control.
Figure 7:
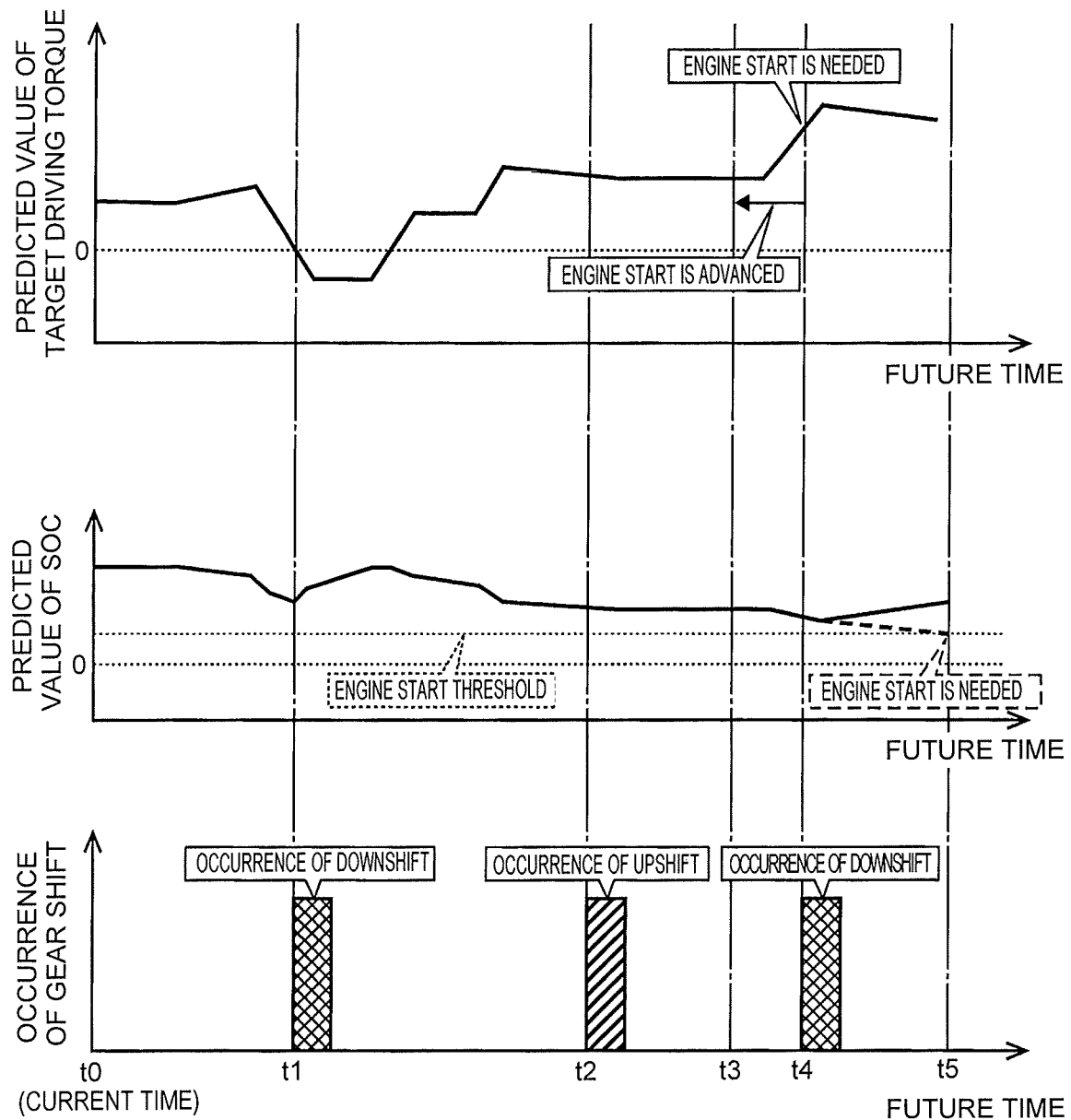
FIG. 7 is an example of an execution manner when the control operation shown by the flowchart in FIG. 6 is executed.

FIG. 6 is a flowchart for describing the control operation for avoiding one control, of the engine start control and the AT gear shift control, being executed late in the same way relative to the period during which the engine start control and the AT gear shift control are concurrently executed actually in the traveling by a principal part (that is, the automatic driving control) of the control operation of the electronic control unit 90. For example, the flowchart is repeatedly executed. FIG. 7 is an example of an execution manner when the control operation shown by the flowchart in FIG. 6 is executed.

In FIG. 6, first, in step S10 (hereinafter, "step" is omitted) corresponding to a function of the state determination unit 94, it is determined whether the vehicle 10 has been set to the automatic driving mode. In the case where the negative determination is made in S10, the routine is ended. In the case where the positive determination is made in S10, in S20 corresponding to a function of the concurrent execution prediction unit 96, the change manner of the predicted value of the target driving torque and the change manner of the predicted value of the state-of-charge SOC of the battery 54 in the future traveling under the automatic driving control are calculated based on the target traveling state such as the target route set in the automatic driving control. Next, in S30 corresponding to a function of the concurrent execution prediction unit 96, it is determined whether the engine start control will be needed in the future traveling under the automatic driving control, based on the change manner of the predicted value of the target driving torque and the change manner of the predicted value of the state-of-charge SOC of the battery 54. In the case where the negative determination is made in S30, in S40 corresponding to functions of the driving control unit 91 and the AT gear shift control unit 92, the sequence process of the engine start control and the AT gear shift control is not needed, and therefore, the normal AT gear shift control is executed using the AT gear shift map. In the case where the positive determination is made in S30, in S50 corresponding to a function of the concurrent execution prediction unit 96, the occurrence of the AT gear shift control in the future traveling under the automatic driving control is predicted based on the change manner of the predicted value of the target driving torque. Next, in S60 corresponding to a function of the concurrent execution prediction unit 96, it is determined whether the execution period of the engine start control and the execution period of the AT gear shift control will overlap in the future traveling under the automatic driving control. In the case where the negative determination is made in S60, in S70 corresponding to functions of the driving control unit 91, the AT gear shift control unit 92 and the hybrid control unit 93, the engine start control is executed at a necessary timing, and the normal AT gear shift control is executed using the AT gear shift map. In the case where the positive determination is made in S60, in S80 corresponding to a function of the state determination unit 94, it is determined whether the engine start control can be advanced. In the case where the positive determination is made in S80, in S90 corresponding to a function of the sequence processing unit 98, as shown by "b" in FIG. 5, the engine start control is executed just before the AT gear shift control, such that the concurrent execution with the AT gear shift control is avoided, and the normal AT gear shift control is executed using the AT gear shift map. In the case where the negative determination is made in S80, in S100 corresponding to a function of the sequence processing unit 98, the AT gear shift control is advanced and executed, such that the concurrent execution with the engine start control is avoided, and the engine start control is executed at a normal timing.

FIG. 7 shows an execution manner when the automatic driving control is being executed. In FIG. 7, since the automatic driving control is being executed, the change manner of the predicted value of the target driving torque and the change manner of the predicted value of the state-of-charge SOC of the battery 54 in the future traveling can be calculated (see a range after time t0). The occurrence of the AT gear shift control is predicted based on the predicted value of the target driving torque, the target vehicle speed and the like (see time t1, time t2 and time t4). Further, time t4 is a time point when it is determined that the traveling mode will transition from the motor traveling mode to the hybrid traveling mode due to the increase in the predicted value of the target driving torque and it is determined that the engine start control will be needed in the future traveling. In the execution manner, the downshift of the stepped transmission unit 20 predicted at time t4 and the engine start control are concurrently executed, and therefore, the engine start control is advanced so as to be started at time t3, during the execution of the automatic driving control. In the execution manner, the engine start control is not based on the predicted value of the state-of-charge SOC shown by a solid line. A broken line showing the predicted value of the state-of-charge SOC shows an example when the engine 14 is not started. In the case where the predicted value of the state-of-charge SOC decreases as shown by the broken line and the state-of-charge SOC becomes lower than the engine start threshold, the engine start control is needed (see time t5).

As described above, with the embodiment, in the case where it is determined that there is a possibility that the engine start control and the AT gear shift control will be concurrently executed in the future traveling under the automatic driving control, one control of the engine start control and the AT gear shift control is first executed in the future traveling, and the other control is executed after the one control finishes. Accordingly, it is possible to perform the control of executing the engine start control and the AT gear shift control in turn, without an actual occurrence of the situation where the engine start control and the AT gear shift control are concurrently executed actually in the future driving under the automatic driving control. Therefore, it is possible to avoid one control, of the engine start control and the AT gear shift control, being executed late in the same way relative to the period during which the engine start control and the AT gear shift control are concurrently executed actually, in the traveling under the automatic driving control.

Further, with the embodiment, the engine start control is executed such that the engine start control finishes before the execution start time point of the AT gear shift control when it is determined that there is a possibility that the engine start control and the AT gear shift control will be concurrently executed. Accordingly, it is possible to restrain shock due to the concurrent execution of the engine start control and the AT gear shift control. Further, in a circumstance where the increase in driving torque is needed, the engine 14 is started early, and thereby, the acceleration responsiveness is improved.

Further, with the embodiment, the AT gear shift control is executed such that the AT gear shift control finishes before the execution start time point of the engine start control when it is determined that there is a possibility that the engine start control and the AT gear shift control will be concurrently executed. Accordingly, it is possible to restrain the shock due to the concurrent execution of the engine start control and the AT gear shift control. Further, in the circumstance where the increase in driving torque is needed, for example, the downshift of the stepped transmission unit 20 is executed early, and thereby, the acceleration responsiveness is improved.

Next, other embodiments of the disclosure will be described. In the following description, identical reference characters are assigned to parts that are common among the embodiments, and descriptions of the parts are omitted.

Second Embodiment

In the above-described first embodiment, the execution manner in which the engine start control is advanced has been shown as an example of the sequence process of executing the engine start control and the AT gear shift control in turn. The advance of the engine start control allows the improvement in acceleration responsiveness, but can cause the deterioration in fuel efficiency. In the case where it is determined that the engine start control will be needed in the future traveling under the automatic driving control because the state-of-charge SOC of the battery 54 will become lower than the engine start threshold, it is less necessary to secure the acceleration responsiveness. In the sequence process, the engine start control may be executed late such that the engine start control is started after the period during which the execution period of the engine start control and the execution period of the AT gear shift control can overlap. That is, the engine start control may be delayed to be executed.

In the case where the concurrent execution prediction unit 96 determines that there is a possibility that the engine start control and the AT gear shift control will be concurrently executed in the future traveling under the automatic driving control, the sequence processing unit 98, for example, outputs the command to execute the normal gear shift of the stepped transmission unit 20 using the AT gear shift map, to the AT gear shift control unit 92, and outputs a command to execute the engine start control after the AT gear shift control finishes when it is determined that there is a possibility that the engine start control and the AT gear shift control will be concurrently executed, to the hybrid control unit 93.

Figure 8:
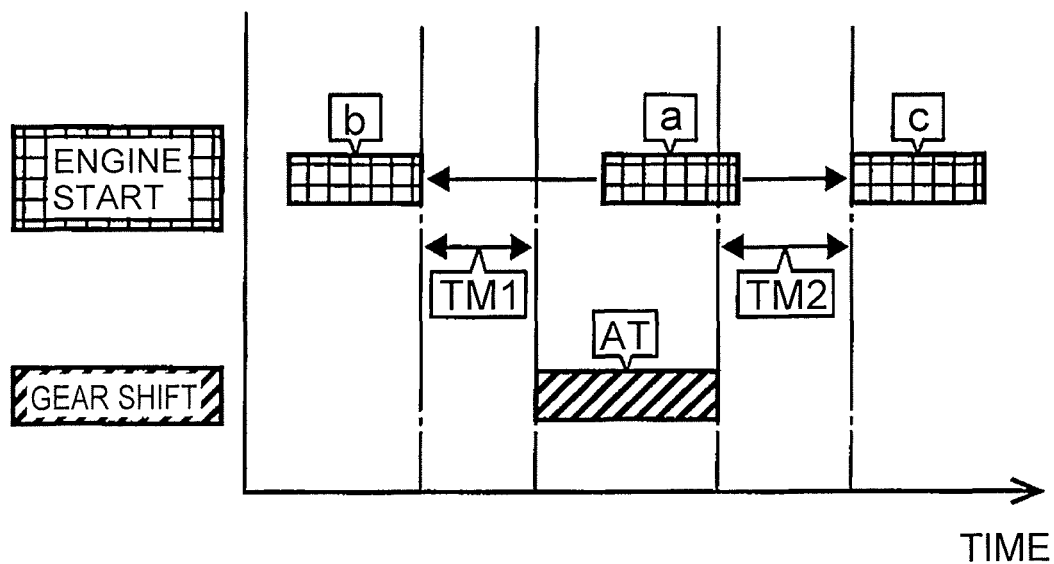
FIG. 8 is a diagram for describing an example of the case where the engine start control is delayed relative to the AT gear shift control.

FIG. 8 is a diagram for describing an example of the case where the engine start control is delayed relative to the AT gear shift control. FIG. 8 shows the example of the case where the engine start control is delayed, in addition to the example of the case shown in FIG. 5 where the engine start control is advanced. In FIG. 8, when the AT gear shift control is executed at the normal timing shown by "AT" and the engine start control is executed at the normal timing shown by "a", the AT gear shift control and the engine start control are concurrently executed. In this case, the engine start control is delayed so as to be executed at a timing shown by "c". A period TM2 in FIG. 8 is a time for surely avoiding the concurrent execution of the AT gear shift control and the engine start control in consideration of variability in the gear shift time of the AT gear shift control.

As described above, with the embodiment, the engine start control is executed after the AT gear shift control finishes when it is determined that there is a possibility that the engine start control and the AT gear shift control will be concurrently executed. Accordingly, it is possible to restrain the shock due to the concurrent execution of the engine start control and the AT gear shift control. Further, in a circumstance where the increase in driving torque is not required, the engine 14 is started late, and thereby, the fuel efficiency is improved.

Third Embodiment

In the above-described first and second embodiments, the sequence process is executed, by shifting the timing of one control of the engine start control and the AT gear shift control relative to the normal timing based on the target traveling state, without altering the target traveling state such as the target route, the target driving torque and the target vehicle speed. Here, by altering the target traveling state, it is possible to shift the normal timing itself based on the target traveling state. In the embodiment, the sequence process is executed by altering the target traveling state.

In the case where the concurrent execution prediction unit 96 determines that there is a possibility that the engine start control and the AT gear shift control will be concurrently executed in the future traveling under the automatic driving control, the sequence processing unit 98 outputs a command to alter the target traveling state of the automatic driving control when it is determined that there is a possibility that the engine start control and the AT gear shift control will be concurrently executed, to the driving control unit 91.

The sequence processing unit outputs, to the driving control unit 91, a command to alter the target traveling state of the automatic driving control by altering the change manner of the required driving amount when it is determined that there is a possibility that the engine start control and the AT gear shift control will be concurrently executed, for example, by altering the change manner of the target driving torque. The target traveling state of the automatic driving control can be altered also by altering the target route, the target vehicle speed or the like.

Figure 9:
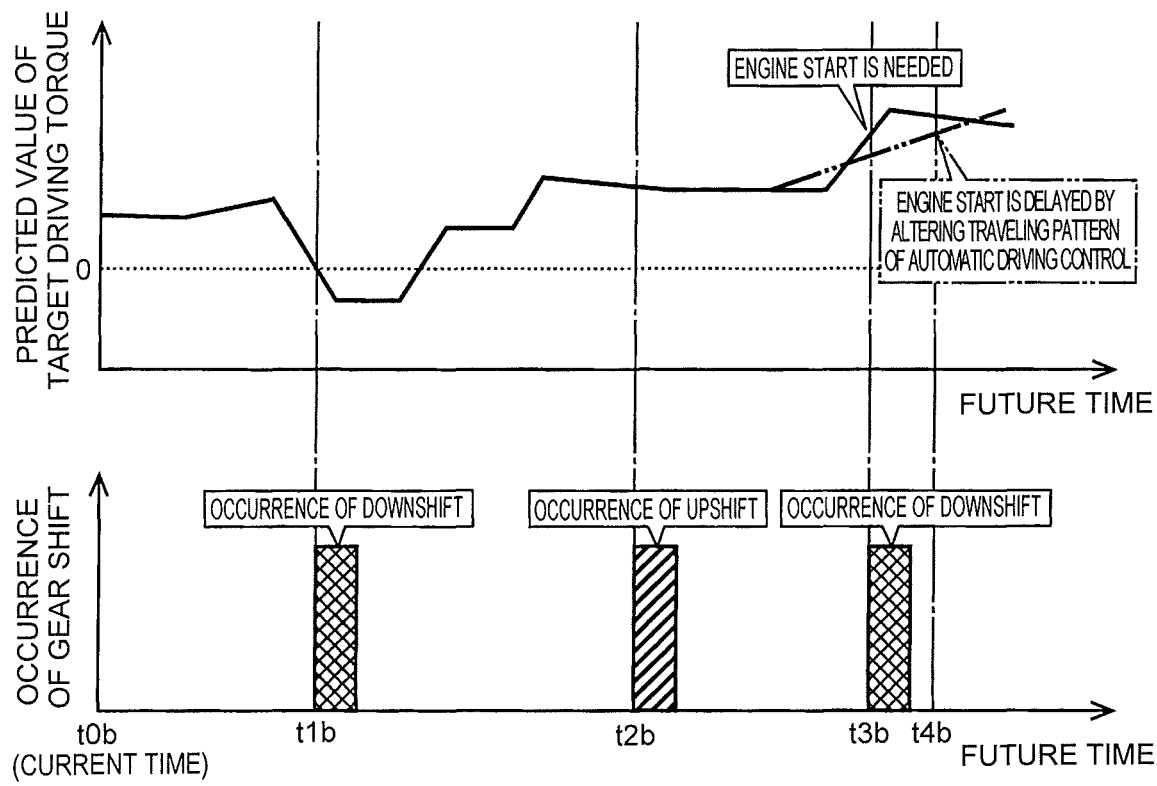
FIG. 9 is a diagram for describing an example of an execution manner when the automatic driving control is being executed, which is an example of the case where a target traveling state is altered.

FIG. 9 shows an execution manner when the automatic driving control is being executed. In FIG. 9, the change manner of the predicted value of the target driving torque shown by a solid line (see a range after time t0b), the determination that the engine start control will be needed due to the increase in the predicted value of the target driving torque shown by the solid line (see time t3b) and the prediction of the occurrence of the AT gear shift control (see time t1b, time t2b and time t3b) are the same as those in FIG. 7. In the execution manner, the downshift of the stepped transmission unit 20 predicted at time t3b and the engine start control are concurrently executed, and therefore, the change manner of the target driving torque relevant to the concurrent execution is altered during the execution of the automatic driving control, as shown by a dashed-two dotted line. In the change manner of the target driving torque shown by the dashed-two dotted line, the increase in the target driving torque is started earlier than in the change manner of the target driving torque shown by the solid line. However, the increase gradient is small, and therefore, it is determined late that the engine start control will be needed due to the increase in the predicted value of the target driving torque (see time t4b). Thereby, in the change manner of the target driving torque shown by dashed-two dotted line, the engine start control is delayed so as to be started at time t4b. Here, "altering traveling pattern of automatic driving control" in FIG. 9 is equivalent to "altering target traveling state of automatic driving control".

Figure 10:
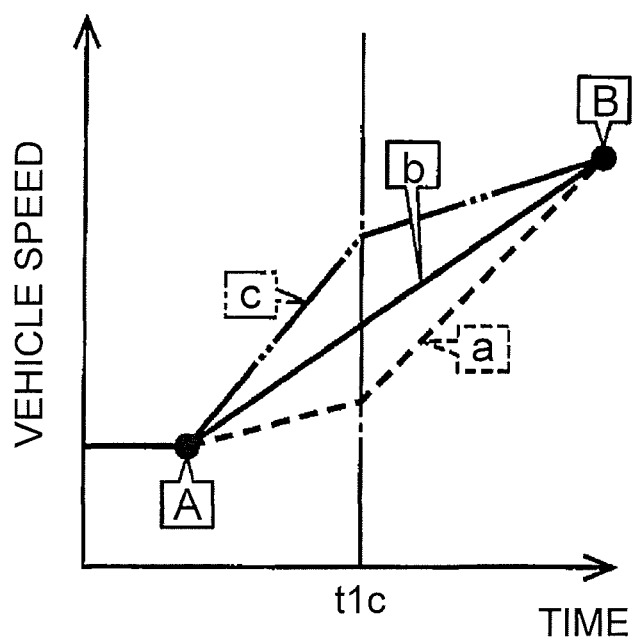
FIG. 10 is a diagram for describing an example of the case where a change manner when a vehicle speed is increased is altered during execution of the automatic driving control.

FIG. 10 is a diagram for describing an example of the case where the change manner when the vehicle speed V is increased is altered during the execution of the automatic driving control, that is, an example of the case where the traveling pattern of the automatic driving control is altered. In FIG. 10, each of a broken line a, a solid line b and a dashed-two dotted line c shows the change manner of the vehicle speed V when the vehicle 10 is accelerated from a point A to a point B. The solid line b shows an example in the case of changing the vehicle speed V at a nearly constant acceleration by accelerating the vehicle 10 at a nearly constant middle target driving torque. The broken line a shows an example in the case of changing the vehicle speed V so as to initially accelerate the vehicle 10 at a low target driving torque and increase the acceleration from the middle by increasing the target driving torque after time t1c. The dashed-two dotted line c shows an example in the case of changing the vehicle speed V so as to initially accelerate the vehicle 10 at a high target driving torque and decrease the acceleration form the middle by decreasing the target driving torque after time t1c. Among the broken line a, the solid line b and the dashed-two dotted c, the change manner of the increase in the target driving torque differs, and therefore, the timing when the engine start control is needed can vary. Further, in the broken line a, time t1c is set to a late time point, and thereby, the timing when the engine start control is needed can be set to a later timing. Further, in the dashed-two dotted line c, time t1c is set to an early time point, and thereby, the timing when the engine start control is needed can be set to an earlier timing. In each case, the vehicle speed V at the point B is identical, and therefore, the acceleration between the point A and the point B is identical, so that an uncomfortable feeling due to the difference in the traveling pattern of the automatic driving control is restrained.

The state determination unit 94 determines whether the target traveling state of the automatic driving control when it is determined that there is a possibility that the engine start control and the AT gear shift control will be concurrently executed can be altered. For example, the state determination unit 94 determines whether the target traveling state of the automatic driving control can be altered, by determining whether the target traveling state itself can be altered based on the target route in the automatic driving control. Further, for example, the state determination unit 94 determines whether the target traveling state of the automatic driving control can be altered, by determining whether the concurrent execution of the engine start control and the AT gear shift control can be avoided when the target traveling state of the automatic traveling control is altered.

In the case where the state determination unit 94 determines that there is a possibility that the target traveling state of the automatic driving control can be altered, the sequence processing unit 98 alters the target traveling state of the automatic driving control.

In the embodiment, in S80 of FIG. 6, instead of the execution manner in the above-described first embodiment, it is determined whether the target traveling state of the automatic driving control when it is determined that there is a possibility that the engine start control and the AT gear shift control will be concurrently executed can be altered. In S90 of FIG. 6, instead of the execution manner in the above-described first embodiment, the target traveling state of the automatic driving control is altered. For example, as shown by the dashed-two dotted line in FIG. 9, the increase in the target driving torque is started earlier, and thereby, the change manner of the target driving torque is altered such that the increase in gradient is smaller. In S100 of FIG. 6, instead of the execution manner in the above-described first embodiment, the sequence process is executed without altering the target traveling state.

As described above, with the embodiment, in the case where it is determined that there is a possibility that the engine start control and the AT gear shift control will be concurrently executed in the future traveling under the automatic driving control, the target traveling state of the automatic driving control when it is determined that there is a possibility that the engine start control and the AT gear shift control will be concurrently executed is altered. Accordingly, it is possible to first execute one control of the engine start control and the AT gear shift control in the future traveling. Thereby, it is possible to restrain the shock due to the concurrent execution of the engine start control and the AT gear shift control. Further, in the circumstance where the increase in driving torque is needed, the acceleration responsiveness is improved.

Further, with the embodiment, the target traveling state of the automatic driving control is altered by altering the change manner of the required driving amount when it is determined that there is a possibility that the engine start control and the AT gear shift control will be concurrently executed. Accordingly, one control of the engine start control and the AT gear shift control is appropriately executed first, in the future traveling.

Further, with the embodiment, in the case where it is determined that the target traveling state of the automatic driving control can be altered, the target traveling state of the automatic driving control is altered. Accordingly, it is possible to determine whether it is possible to avoid an actual occurrence of the situation where the engine start control and the AT gear shift control are concurrently executed in the traveling under the automatic driving control, and it is possible to appropriately perform the control of executing the engine start control and the AT gear shift control in turn, based on the determination result.

The embodiments of the disclosure have been described above in detail, based on the drawings. The disclosure is applied as other modes.

For example, in the above-described embodiments, in the case where it is determined that there is a possibility that the engine start control and the AT gear shift control will be concurrently executed in the future traveling under the automatic traveling control, the engine start control may be advanced, the engine start control may be delayed, the AT gear shift control may be advanced, or the target traveling state of the automatic driving control may be altered, without the execution of S80 of FIG. 6. That is, S80 of FIG. 6 does not always need to be executed. Further, in the case where it is determined that there is a possibility that the engine start control and the AT gear shift control will be concurrently executed in the future traveling under the automatic driving control, the sequence process may be executed by delaying the AT gear shift control. In this mode also, it is possible to perform the control of executing the engine start control and the AT gear shift control in turn, without an actual occurrence of the situation where the engine start control and the AT gear shift control are concurrently executed in the traveling under the automatic driving control.

Further, in the above-described embodiments, the stepless transmission unit 18 may be a transmission mechanism in which the differential operation can be restricted by the control of the clutch or brake coupled to the rotating element of the differential mechanism 32. Further, the differential mechanism 32 may be a double pinion planetary gear device. Further, the differential mechanism 32 may be a differential mechanism that is constituted by a plurality of planetary gear devices coupled to each other so as to include four or more rotating elements. Further, the differential mechanism 32 may be a differential gear in which the first rotating machine MG1 and the intermediate transmitting member 30 are coupled to a pinion that is rotated and driven by the engine 14 and a pair of bevel gears that engage with the pinion. Further, in a configuration in which two or more planetary gear devices are coupled to each other through some rotating elements constituting the planetary gear devices, the differential mechanism 32 may be a mechanism in which an engine, a rotating machine and driving wheels are coupled to the rotating elements of the planetary gear devices such that dynamic power can be transmitted.

In the above-described embodiments, the vehicle 10 may be a vehicle that includes only the stepped transmission unit 20 without including the stepless transmission unit 18. Further, the vehicle 10 may be a parallel hybrid vehicle in which the dynamic power of the engine and the rotating machine is transmitted to the driving wheels through the automatic transmission. Further, the vehicle 10 may be a series hybrid vehicle in which the generated electric power of the electric generator to be driven by the dynamic power of the engine and/or the dynamic power of the rotating machine to be driven by the electric power of the battery is transmitted to the driving wheels through the automatic transmission. In the series hybrid vehicle, the engine may be provided such that the engine torque is not mechanically transmitted to the driving wheels. That is, in the series hybrid vehicle, the engine does not need to be mechanically coupled to the driving wheels such that dynamic power can be transmitted, and does not need to be a dynamic power source for traveling. The automatic transmission may be a planetary gear-type automatic transmission such as the stepped transmission unit 20, or may be an automatic transmission such as a synchromesh parallel two-axis-type automatic transmission and a known dual clutch transmission (DCT) that is a synchromesh parallel two-axis-type automatic transmission including two input shafts. In short, the disclosure can be applied to a vehicle including an engine, a rotating machine that functions as a dynamic power source for traveling, and an automatic transmission that constitutes a part of a dynamic power transmission route between the rotating machine and a driving wheel.

Each of the above-described embodiments is just an embodiment, and the disclosure can be carried out while various modifications and improvements are added based on the knowledge of a person skilled in the art.

What is claimed is:

1. A control device for a vehicle, the vehicle including an engine, a rotating machine that functions as a dynamic power source for traveling, and an automatic transmission that constitutes a part of a dynamic power transmitting route between the rotating machine and a driving wheel, the control device being comprising
    an electronic control unit configured to set a target traveling state, to perform an automatic driving control for traveling by automatically performing acceleration or deceleration and steering based on the target traveling state, to determine whether there is a possibility that a start control of the engine and a gear shift control of the automatic transmission are concurrently executed in a future traveling under the automatic driving control, during execution of the automatic driving control, and to first execute one control of the start control of the engine and the gear shift control of the automatic transmission in the future traveling and execute the other control after the one control finishes, when the electronic control unit determines that there is the possibility that the start control of the engine and the gear shift control of the automatic transmission are concurrently executed in the future traveling under the automatic driving control.

2. The control device for the vehicle according to claim 1, wherein the electronic control unit is configured to execute the start control of the engine such that the start control of the engine finishes before an execution start time point of the gear shift control of the automatic transmission when the electronic control unit determines that there is the possibility that the start control of the engine and the gear shift control of the automatic transmission are concurrently executed.

3. The control device for the vehicle according to claim 1, wherein the electronic control unit is configured to execute the start control of the engine after the gear shift control of the automatic transmission finishes when the electronic control unit determines that there is the possibility that the start control of the engine and the gear shift control of the automatic transmission are concurrently executed.

4. The control device for the vehicle according to claim 1, wherein the electronic control unit is configured to execute the gear shift control of the automatic transmission such that the gear shift control of the automatic transmission finishes before an execution start time point of the start control of the engine when the electronic control unit determines that there is the possibility that the start control of the engine and the gear shift control of the automatic transmission are concurrently executed.

5. The control device for the vehicle according to claim 1, wherein the electronic control unit is configured to alter the target traveling state of the automatic driving control when the electronic control unit determines that there is the possibility that the start control of the engine and the gear shift control of the automatic transmission are concurrently executed, when the electronic control unit determines that there is the possibility that the start control of the engine and the gear shift control of the automatic transmission are concurrently executed in the future traveling under the automatic driving control.

6. The control device for the vehicle according to claim 5, wherein the electronic control unit is configured to alter the target traveling state of the automatic driving control by altering a change manner of a required driving amount when the electronic control unit determines that there is the possibility that the start control of the engine and the gear shift control of the automatic transmission are concurrently executed.

7. The control device for the vehicle according to claim 5, wherein:
    the electronic control unit is configured to determine whether the electronic control unit is able to alter the target traveling state of the automatic driving control when the electronic control unit determines that there is the possibility that the start control of the engine and the gear shift control of the automatic transmission are concurrently executed; and
    the electronic control unit is configured to alter the target traveling state of the automatic driving control when the electronic control unit determines that the electronic control unit is able to alter the target traveling state of the automatic driving control.

* * * * *